United States Patent
Dhillon et al.

(10) Patent No.: US 10,169,808 B2
(45) Date of Patent: Jan. 1, 2019

(54) RULE BASED CLOSURE OF PURCHASE ORDERS

(71) Applicant: Oracle International Corporation, Redwood Shores, CA (US)

(72) Inventors: Alexandra Dhillon, Dublin, CA (US); Elaine Wong, San Ramon, CA (US); Earnest Ivie, Victoria, TX (US); Saravanamaneeian Subhramaniun, Bangalore (IN); Mohan Murugesan, Bangalore (IN); Praveen Kumar, Bangalore (IN)

(73) Assignee: Oracle International Corporation, Redwood Shores ( * ) Notice: Subject to any disclaimer, the term of this patent is extended or adjusted under 35 U.S.C. 154(b) by 1110 days.

(21) Appl. No.: 14/181,546

(22) Filed: Feb. 14, 2014

(65) Prior Publication Data

US 2015/0235299 A1 Aug. 20, 2015

(51) Int. Cl.
G06Q 30/06 (2012.01)
(52) U.S. Cl.
CPC ..... G06Q 30/0635 (2013.01); G06Q 30/0633 (2013.01)
(58) Field of Classification Search
CPC .......................................... G06Q 30/06–30/08
USPC ............................................. 705/26.1–27.2
See application file for complete search history.

(56) References Cited

U.S. PATENT DOCUMENTS

| | | | |
|---|---|---|---|
| 2003/0149578 A1 | 8/2003 | Wong | |
| 2004/0215748 A1* | 10/2004 | Boonie | G06F 9/5011 709/220 |
| 2005/0240524 A1* | 10/2005 | Van De Van | G06Q 20/102 705/40 |
| 2005/0246274 A1 | 11/2005 | Abbott | |
| 2007/0192362 A1* | 8/2007 | Caballero | G06Q 10/06 |
| 2007/0203803 A1* | 8/2007 | Stone | G06Q 10/08 705/80 |
| 2010/0211482 A1 | 8/2010 | Nambiar | |
| 2011/0209094 A1* | 8/2011 | Gasn | G06F 17/30557 715/843 |
| 2012/0084090 A1* | 4/2012 | Woodard | G06Q 10/08 705/1.1 |

(Continued)

OTHER PUBLICATIONS

PeopleSoft Enterprise Purchasing 9.1 PeopleBook, published on Mar. 2011 by Oracle Corporation, 1438 pages.

*Primary Examiner* — Ming Shui
(74) *Attorney, Agent, or Firm* — Kilpatrick Townsend & Stockton, LLP

(57) ABSTRACT

One or more computers may close a purchase order by use of rules. Certain embodiments use values of attributes of a line in a purchase order (PO) to identify a rule among multiple rules. The PO line's attributes which are used to identify the rule are internal to a buyer. When the rule which is identified is disabled, the line is retained unchanged in the purchase order. When the identified rule is not disabled, a user-specified logic which is identified in the rule is used to determine a new value of a numeric term, the numeric term having a preexisting value previously agreed upon by the buyer and the seller, e.g. in units of quantity or units of money. Subsequently, an indication of the line being changed in the purchase order is transmitted to the seller. User may specify different logics in different sets of rules, for different business units.

20 Claims, 18 Drawing Sheets

(56) References Cited

U.S. PATENT DOCUMENTS

2013/0282535 A1* 10/2013 Bhaowal ................ G06Q 20/12
  705/30
2014/0365348 A1* 12/2014 Ballaro .............. G06Q 30/0601
  705/30

* cited by examiner

Maintain Purchase Order

Schedules
Business Unit: US001
PO ID: 00000023　　　　Vendor　　　The Bike Shop
PO Date: 12/08/2013　　PO Status　　Dispatched
　　　　　　　　　　　　Receipt Status　Not Received

Lines
Line: 1　Item: 1000　Biking Jersey　PO Qty: 10　Merchandise Amt: $200

Schedules
| Details | Statuses | Shipment | Matching | Receiving | Freight | RTV | Maintenance WO |

| Schedule # | *Due Date | *Ship To | Status | | | | |
|---|---|---|---|---|---|---|---|
| 1 | 12/18/2013 | US001 | Active | | X | | |
| 2 | 12/19/2013 | US001 ⋮ Create Schedule Change | | | X | | |

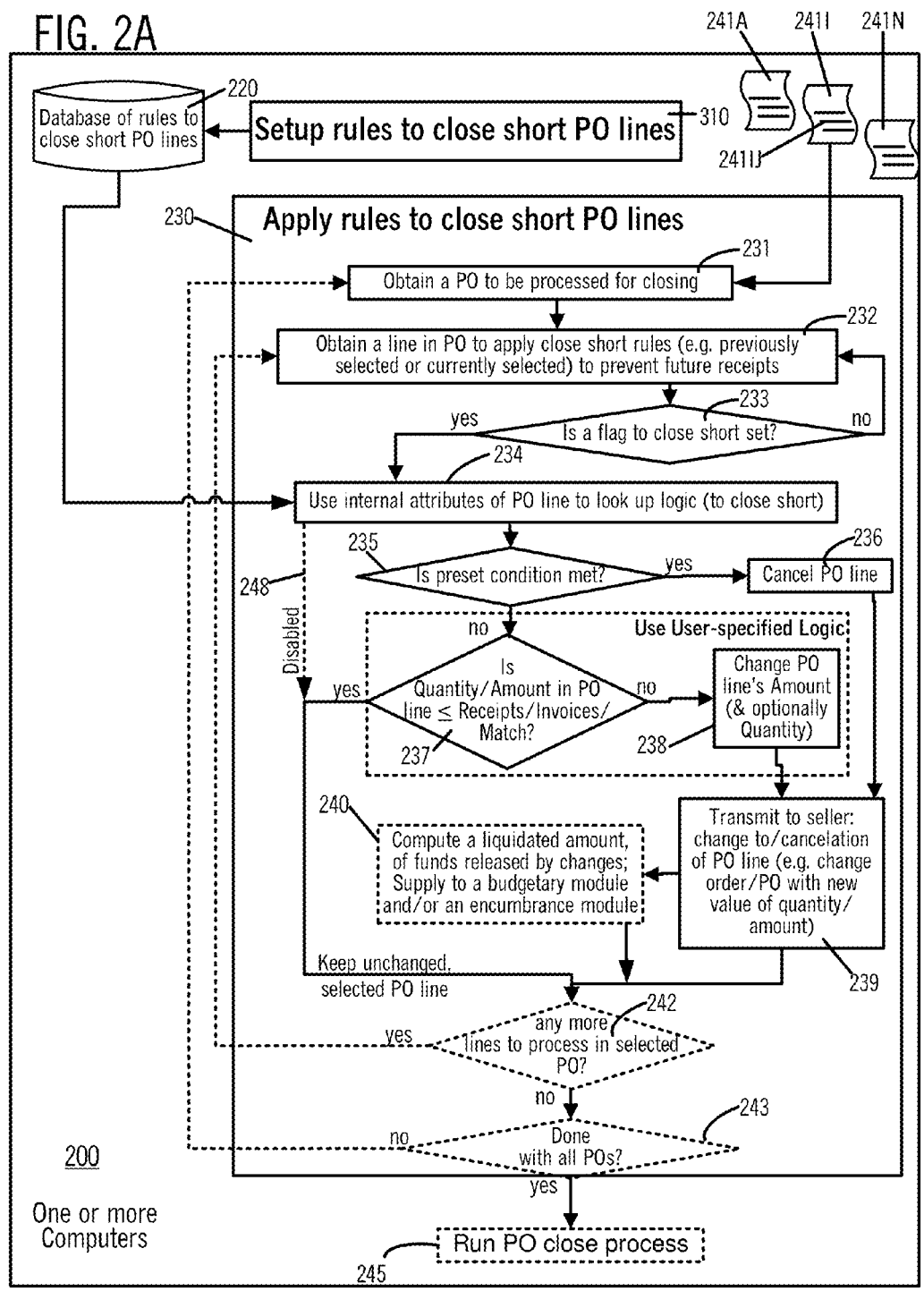

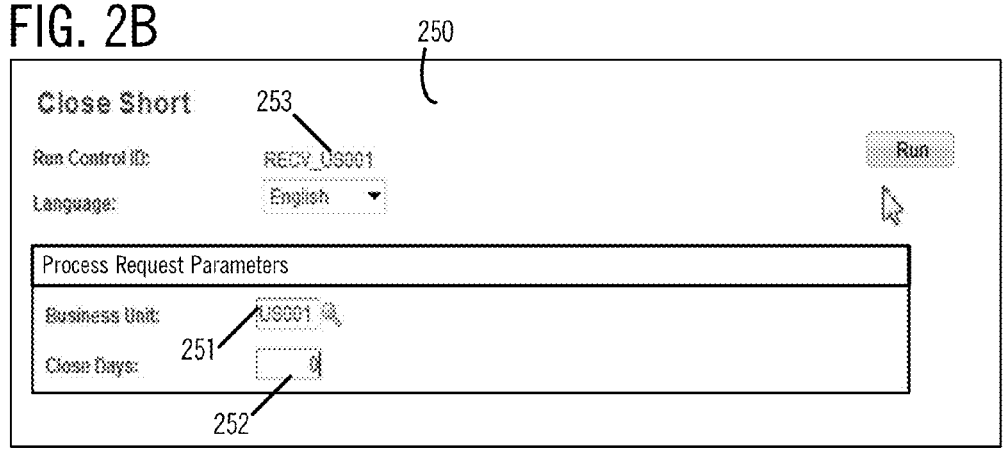
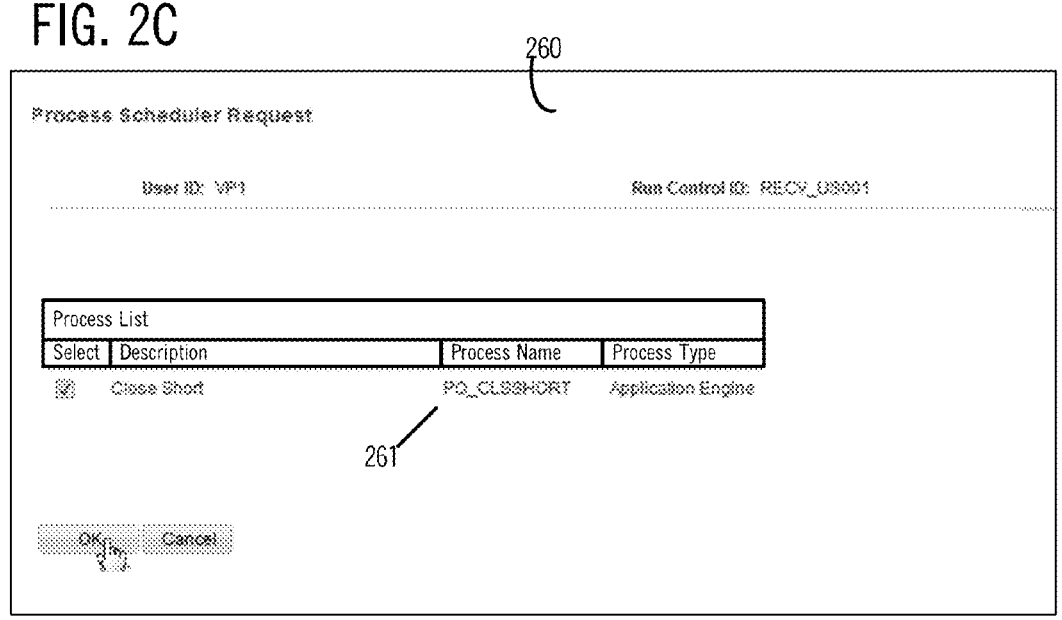

FIG. 3B

Business Unit

Business Unit Definition | Business Unit Options | PO Change Options | Req Change Options | Document Numbe Business Unit: US001 — 321

Receipt Date Adjustment: [10]
DUNS Number: [12345 ▼]
*Receipt Allocation Type: [FIFO ▼]
*PO Price Edit: [Warn ▼]
PO Close Short Rule ID: [STANDARD] 🔍 — 322

— 323
☐ Close Short Set Override
☐ Allow PO Deletion
☐ Allow Requisition Deletion
☐ Accrue PO Receipts
☐ Tax Exempt
☐ Allow Business Item Attributes Liquidate Method
☐ Allow liquidate by Qty when Distribute by Qty
*Default Liquidate Method: [Amount]

| PO Close Short Rules | | | | |
|---|---|---|---|---|
| PO Rule Type | PO Close Short | | | |
| PO Rule ID | STANDARD | | | |
| Description | Standard US Rules | | | |

PO Close Short Rule Details — Personalize | Find | View All — First 1 of 18 Last

| Rule | Receiving Required Option | Amt Only Option | Match Line Option | *Close Short Set Option |
|---|---|---|---|---|
| 1 | Required | ☐ | Evaluated Receipt Settlement | Received Quantity ▼ |
| 2 | Required | ☐ | Full Match | Received Quantity ▼ |
| 3 | Required | ☐ | Don't Match | Vouchered Quantity ▼ |
| 4 | Required | ☑ | Evaluated Receipt Settlement | Received Amount ▼ |
| 5 | Required | ☑ | Full Match | Received Amount ▼ |
| 6 | Required | ☐ | Don't Match | Disable ▼ |
| 7 | Do Not | ☐ | Evaluated Receipt Settlement | Matched Quantity ▼ |
| 8 | Do Not | ☐ | Full Match | |

Reset Default Values

Maintain Purchase Order

Purchase Order ← 2411I

Business Unit: US001 — 321
PO ID: 00000023   PO Status: Approved
                  Budget Status: Not Checked ▼ Header PO Date: 12/08/2013 ▶
Vendor: The Bike Shop ▶      Vendor Details      Dispatch Method [Print ▶] (Dispatch) ← 431
Buyer: VP1 ▶                 Kenneth Schumacher
Receipt Status: Not Received                     Amount Summary
                                                 Merchandise: $200   Total: $200
Header Details    Activity Summary    Add Comments         Freight/Tax: $0   (Calculate)
PO Activities     PO Defaults         Use Procurement Card     Add Items from Purchasing Kit
                                                                Add Items from Catalog      Item Search

PO Lines                                                                          }— 414

| Details | Statuses | Ship To/Due | Item Info. | Attributes | RFQ | Contract | Receiving |
|---|---|---|---|---|---|---|---|
| Line # | Item | Description | | PO Qty | *UOM | Category | Price | Amount |
| 1 | 1000 ▶ | Biking Jersey, Long sle ▶ | | 10 ▶ | EA ▶ | Cycling | 20 ▶ | 200.00 |
|  |  |  |  |  |  |  | ... |  |

Maintain Purchase Order

Purchase Order
Business Unit: US001
PO ID: 00000023          PO Status: Approved
                         Budget Status: Not Checked ▼ Header

| | | | |
|---|---|---|---|
| PO Date | 12/08/2013 ▶ | Dispatch Method | Print ▶ (Dispatch) |
| Vendor | The Bike Shop ▶ | | |
| Buyer | VP1 ▶ | Amount Summary | |
| Receipt Status: | Not Received | Merchandise: $200  Total: $200 | |
| | | Freight/Tax: $0 | (Calculate) |
| Header Details | Activity Summary | Add Items from Purchasing Kit | |
| PO Activities | PO Defaults | Add Items from Catalog | Item Search |

PO Lines

| Details | Statuses | Ship To/Due | Item Info. | Attributes | Physical Nature | RFQ | Contract | Receiving | Amount Only |
|---|---|---|---|---|---|---|---|---|---|
| Line # | Item | Description | | | Goods ▶ | | | PO ▶ | ☐ |
| 1 | 1000 | Biking Jersey, | | | | | | | |

Maintain Purchase Order

Schedules
Business Unit: US001
PO ID: 00000023
PO Date: 12/08/2013

Vendor: The Bike Shop
PO Status: Approved

PO Lines

Line: 1  Item: 1000  Biking Jersey  PO Qty: 10  Merchandise Amt: $200

Schedules

| Details | Statuses | Shipment | Matching | Receiving | Match Status | Freight | RTV | Maintenance WO | Price Tolerance over |
|---|---|---|---|---|---|---|---|---|---|
| Sched # | *Due Date | | *Ship To | | | *Matching | | | |
| 1 | 12/18/2013 | | US001 | | Not Matched | Don't Match | | | |

FIG. 4D

Maintain Purchase Order

Purchase Order
Business Unit: US001
PO ID: 00000023
PO Status: Approved
Budget Staus: Not Checked ▼ Header PO Date: 12/08/2013
Vendor: The Bike Shop — Vendor Details
Buyer: VP1 — Kenneth Schumacher
Receipt Status: Not Received Header Details | Activity Summary | Add Comments
PO Activities | PO Defaults | Use Procurement Card Dispatch Method: Print [Dispatch]

Amount Summary
Merchandise: $200    Total: $200
Freight/Tax: $0    [Calculate]

Add Items from Purchasing Kit
Add Items from Catalog    Item Search

PO Lines

| Details | Statuses | Ship To/Due | Item Info. | Attributes | RFQ | Contract | Receiving |

| Line # | Item | Description | *Receiving Required | Close Short Line | Inspect ID |
|---|---|---|---|---|---|
| 1 | 1000 | Biking Jersey | Required ▼ | ☐ | ... |

[Delete PO]    [Close Short All Lines]

View Printable Version

RULE BASED CLOSURE OF PURCHASE ORDERS

FIELD

This patent application relates to apparatuses, methods and non-transitory computer-readable storage media that use one or more rules to close purchase orders.

BACKGROUND

Purchase orders are legal contracts between buyers and sellers, pursuant to which sellers supply goods and/or services to buyers, and in exchange thereof sellers receive payments from buyers. For example, an employee of a buyer may set up a purchase order in a computer 100 illustrated in FIG. 1A. Each purchase order (PO) may include multiple lines, such as line 1 for item 1000 and line 2 for item 1002 as shown in FIG. 1A. Each line of a PO holds information on a specific item being purchased by the buyer, such as a unique identifier of the item, a description of the item, a category of the item, and total quantity of the item to be purchased. When delivery of the item identified in a PO line is to be split among multiple locations and/or on multiple dates, the PO line includes the details of locations and dates in rows (called "schedules", "delivery schedules" or "shipments"). For example, FIGS. 1B and 1C illustrate two rows with due dates of Dec. 18, 2013 and Dec. 19, 2013 which are included as two "schedules" of PO line 1 for item 1000 with item description "Biking Jersey" shown in FIG. 1A.

After some (typically all) goods and/or services specified in a purchase order have been delivered by the seller, buyer's employee may change the purchase order by generating a change order, by clicking on a "A" using a mouse as illustrated in FIG. 1C. To generate the change order, it may be necessary to manually gather certain information, such as the quantity of item 1000 received for line 1 being 4.0, as shown in a column with the header "*PO Qty" shown in FIG. 1D. Thus, a prior art buyer's employee may need to mentally remember such information, for use in input into another screen (not shown) to generate the change order. Some prior art change orders are described in, for example, US Patent Application Publication 2010/0211482 by Nambiar et al. published Aug. 19, 2010, entitled "Change Order Template For Purchase Order Document Amendment" which is incorporated by reference herein in its entirety, as background.

A status of "close" (or "final close") of a purchase order indicates that the purchase order cannot be used for any further receiving or invoicing in future. Such "closing" (or "final closing") of a purchase order is commonly performed by the buyer's employee after a match (or "final match") between: (1) a purchase order, (2) a receipt indicating that goods and/or services were received as specified in the purchase order, and (3) an invoice (or debit note or voucher) for the amount, as specified in the purchase order. The just-described match between these three documents is also known in the prior art as a three-way match, e.g. as described in US Patent Application Publication 2005/0240524 by Van De Van et al. published Oct. 27, 2005, entitled "Method and Apparatus For Account Payable Matching For An Online Purchasing System" which is incorporated by reference herein in its entirety, as background.

When all PO lines in a purchase order are expected to have no more receiving, that purchase order may be closed. A closed PO can be re-opened, e.g. as described in US Patent Application Publication 2013/0282535 by Bhaowal et al. published Oct. 24, 2013, entitled "Reopening A Final Closed Purchase Order For Continuation Of Receipt and Invoice" which is incorporated by reference herein in its entirety, as background.

Depending on the nature of goods and/or services, certain purchase orders may be kept open, so that these open purchase orders can be used to match future receipts and/or invoices. For example, a purchase order for a copier may include a first line for the new copier itself, and a second line for toner to be repeatedly delivered in future. When the new copier is delivered and invoiced, the first line in the PO is typically closed (e.g. by performing the above-described three-way match thereon), while the second line in the PO is typically kept open. After passage of several years of normal use, the copier may break-down and get decommissioned, so that no toner is needed. At this stage, the second line can remain open in the purchase order, even though no toner is needed. Closing of the second line may become delayed indefinitely, e.g. if an employee responsible for decommissioning the copier (who may not even know about the purchase order) does not notify another employee responsible for the purchase order.

To address a situation of the type described in the preceding paragraph, a buyer may decide to modify the quantity of an item specified in a PO line, to prevent future receipt of that item. Such a modification can be made manually for each schedule in a PO line, although one prior art system called "PeopleSoft Enterprise Purchasing 9.1" allows a buyer to indicate that a PO line is to be "close short" processed, by clicking a button to select or deselect a "close short" check box. When the check box is checked for a PO line and when certain close short processing requirements are met, the system reduces the quantity specified on each schedule in the PO line, to a quantity that has been received (in situations where the item has been received on the schedule). If there has been no receiving yet, on a schedule in a PO line marked for close short processing, the system cancels that schedule (instead of reducing the quantity to zero). For more details on close short processing, see a book entitled "PeopleSoft Enterprise Purchasing 9.1 PeopleBook", published on March 2011 by Oracle Corporation, which is incorporated by reference herein in its entirety as background.

The inventors of the current patent application believe that the above-described close short processing of PO lines is inflexible as only the received quantity is available for use in changing PO lines. Hence, the current inventors believe there is a need for apparatuses, methods and non-transitory computer-readable storage media of the type described below, to use one or more rules to modify one or more lines in purchase orders during close short processing, following which POs may be closed to terminate a buyer's legal obligation to accept goods and/or services from a seller.

SUMMARY

In several aspects of described embodiments, one or more computers determine a change to one or more numeric terms in a purchase order ("PO"), by use of a rule. A numeric term is any contract term which is expressed as a number and agreed upon by a buyer and seller, e.g. quantity of goods and/or amount of money. One or more numeric term(s) are transmitted between the buyer's computer and the seller's computer to electronically create an enforceable contract, in the form of a purchase order. The purchase order imposes a contractual obligation on the buyer to receive one or more items identified in one or more lines of the purchase order.

When the buyer decides to prevent future receipt of an item, the buyer indicates their decision via user input (e.g. in a check box) selecting in the purchase order, a line ("PO line") that identifies the item.

Based on user input selecting the PO line, the one or more computers identify a rule among multiple rules ("PO close short rules") by use of values of certain attributes of the PO line. The attributes of the PO line that are used to identify a rule, are internal to a buyer and typically (but not necessarily) unknown to a seller (e.g. not transmitted to the seller's computer). The attributes indicate specific conditions under which the buyer determines whether the PO line (or a schedule therein) can be processed in certain ways, e.g. closed. A rule that is identified from among multiple rules by the attribute values of the PO line is in turn used to identify a user-specified logic, which logic is then used to determine a new value of the numeric term.

The numeric term's new value, which is determined by the logic identified in the rule, is stored in memory and used to replace a preexisting value that was previously agreed upon by the buyer and the seller (and transmitted therebetween) e.g. when the PO was created. The new value is stored e.g. in a change order to the PO line in some embodiments, although other embodiments directly use the new value to overwrite the preexisting value resulting in a modified purchase order. The new value is less than the preexisting value, so that storing the new value in the PO line "closes short" the PO line. An indication of the PO line being changed, by use of the new value of the numeric term, is eventually transmitted to at least the seller (e.g. as a change order to the PO, or as a changed PO), preventing future use of the PO line.

Each rule among the multiple rules ("PO close short rules") is set up ahead of time with its own logic, which is selectable in some embodiments via user input (e.g. in a drop-down box or list of values), from among multiple logics that can determine the new value. For example, the new value may be determined to be a sum of receipt amount (e.g. dollar amount of services received), or a matched amount (e.g. dollar amount of services received and matched), or greater of: the matched amount or the sum of receipt amount by three different logics, when the numeric term is expressed in units of money, and the item is services. As another example, the new value may be determined to be a sum of receipt quantity (e.g. number of items received), or a matched quantity (e.g. number of items received and matched), or greater of: the matched quantity or the sum of receipt quantity by three different logics, when the numeric term is expressed in units of quantity, and the item is goods.

A human user employed by the buyer may specify via user input, different logics in different sets of PO close short rules, for different business units. Automatic use of one or more logics, which may be identified by PO close short rules that match internal attributes of a PO line enables close short processing of PO lines that otherwise would remain available in future, for receiving of items that are unnecessary. Close short processing of PO lines can be performed: (1) in some embodiments one PO line at a time e.g. in response to user input identifying each PO line individually to be checked for matching one of the PO close short rules, (2) in other embodiments all lines in open POs of a specific business unit may be checked for close short processing e.g. in a process initiated by a user command or (3) in still other embodiments, all lines may be checked for close short processing in user-selected PO(s).

Closure of POs after use of PO close short rules improves accuracy of calculations of a budget, and/or calculations of encumbrances that would otherwise be inaccurate. Specifically, rule-based processing of one or more PO lines identified as being ready for close short processing can be used to calculate liquidated amounts that in turn can be used in budget and/or encumbrance calculations, based on the buyer's decision to no longer purchase the goods and/or services specified in the one or more PO lines. In addition, rule-based close short processing of one or more lines prevents unnecessary delivery of goods and/or services, eliminating or reducing their return (from the buyer back to the seller).

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIGS. 1A-1D illustrate screens displayed by a computer 100 executing an enterprise resource planning (ERP) software in the prior art.

FIG. 2A illustrates, in a flow chart, acts performed by one or more computers 200 by use of one or more processors programmed with a sequence of instructions of software stored in one or more memories, to implement PO close short rule application, in exemplary embodiments in accordance with the invention.

FIGS. 2B-2D show screens generated by one or more computers 200 of FIG. 2A executing an enterprise resource planning (ERP) software in certain illustrative embodiments.

FIGS. 3B and 3C show screens generated by one or more computers 200 of FIG. 3A executing an enterprise resource planning (ERP) software in certain illustrative embodiments.

FIGS. 4B-4G show screens generated by one or more computers 200 of FIG. 4A executing an enterprise resource planning (ERP) software in certain illustrative embodiments.

DETAILED DESCRIPTION

Figure 1A:
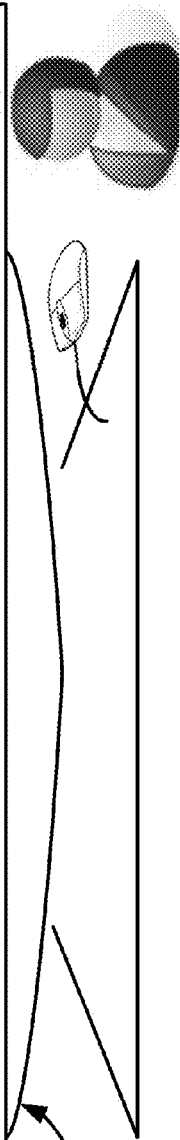
Figure 1B:
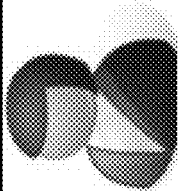
Figure 1D:
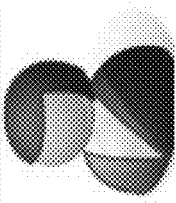
Figure 1D:
Figure 2D:
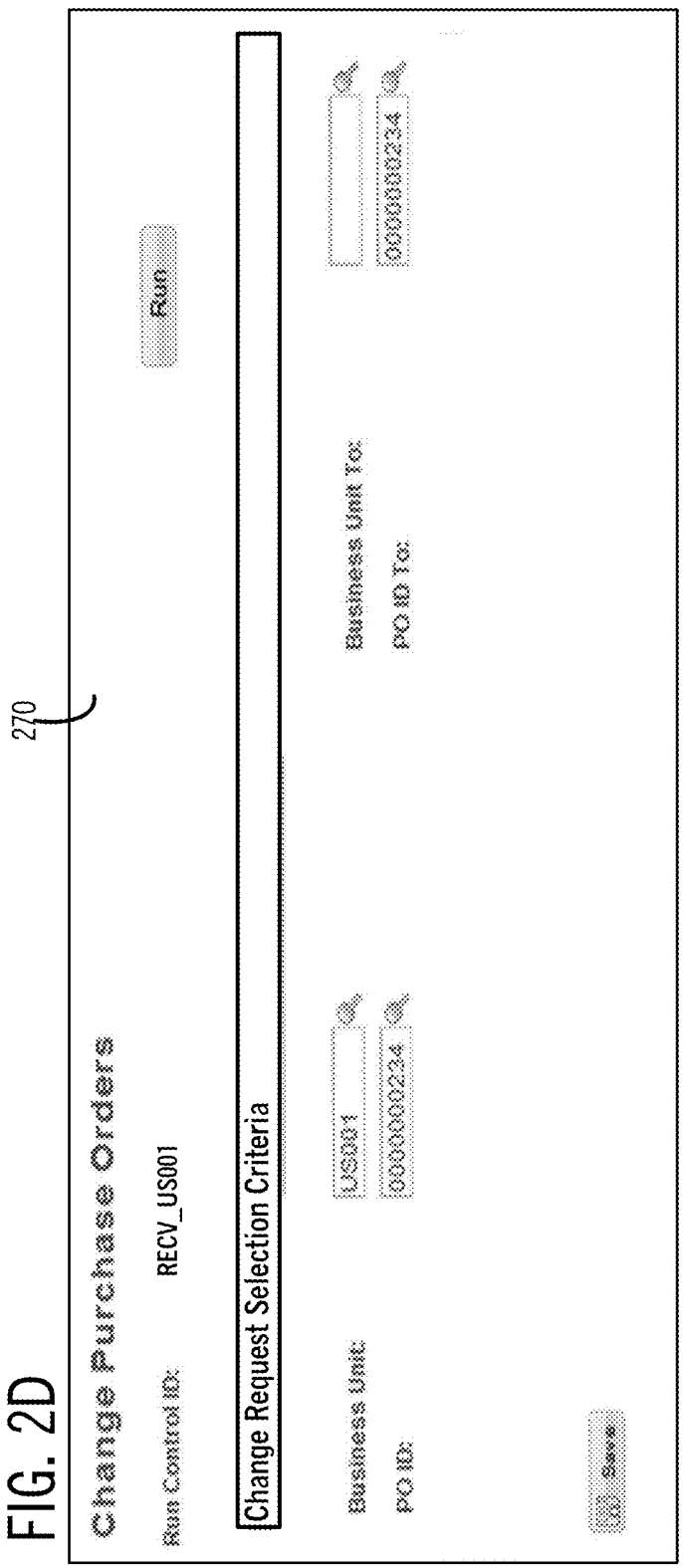

In accordance with the invention, when a buyer decides to prevent future receipt of an item identified in a line 241IJ of a purchase order 241I, the buyer indicates their decision via user input selecting line 241IJ. For example, a user 411 (FIG. 4E) may operate a mouse 415 to place a check mark in a check box in column 457 to indicate the buyer's decision to no longer purchase item 1000, and that line 241I is to be close short processed. Hence, in some embodiments, a check box displayed on a screen and a mouse are included in means for receiving user input selecting a line in a purchase order to be changed to prevent future receipt of an item identified in the line. Other embodiments may use other means, such as a keyboard to receive user input, e.g. via a command line interface on a screen. When purchase order 241I includes multiple lines, user 411 may click on button 459 (FIG. 4E) to indicate selection of all the lines in purchase order 241I as being no longer purchased, and thus ready for close short processing. After a specific PO line 241IJ (FIG. 2A) is selected by user input indicating it is no longer purchased, the one or more computers 200 use a specific rule identified from among multiple rules based on attributes of the specific PO line 241IJ to automatically reduce the value of one or more numeric terms in line 241IJ of purchase order 241I (FIG. 2A).

Purchase order 241I (FIG. 2A) identifies in the normal manner, a buyer, a seller, goods and/or services to be delivered by the seller to the buyer, and further identifies in line ("PO line") 241IJ, numeric terms such as quantities and/or amount of money for the goods and/or services being purchased. PO line 241IJ may include in one or more rows (called "schedules", "delivery schedules" or "shipments") details of locations and dates according to which the seller needs to deliver the item(s) specified in purchase order 241I. When purchase order 241I is initially created by a buyer and communicated to a seller, PO line 241IJ therein can be used by the seller to deliver the item(s) identified therein and invoice for the deliveries received by the buyer. A buyer has a contractual obligation to receive deliveries of the item(s) (in the form of goods and/or services) up to quantities and/or amounts of money specified in PO line 241IJ, unless the numeric term(s) in PO line 241IJ are changed and the change(s) transmitted from buyer's computer(s) 400 (FIG. 4A) to the seller's computer(s) 500 to electronically modify an enforceable contract between buyer and seller (in the form of purchase order 241I).

Figure 3A:
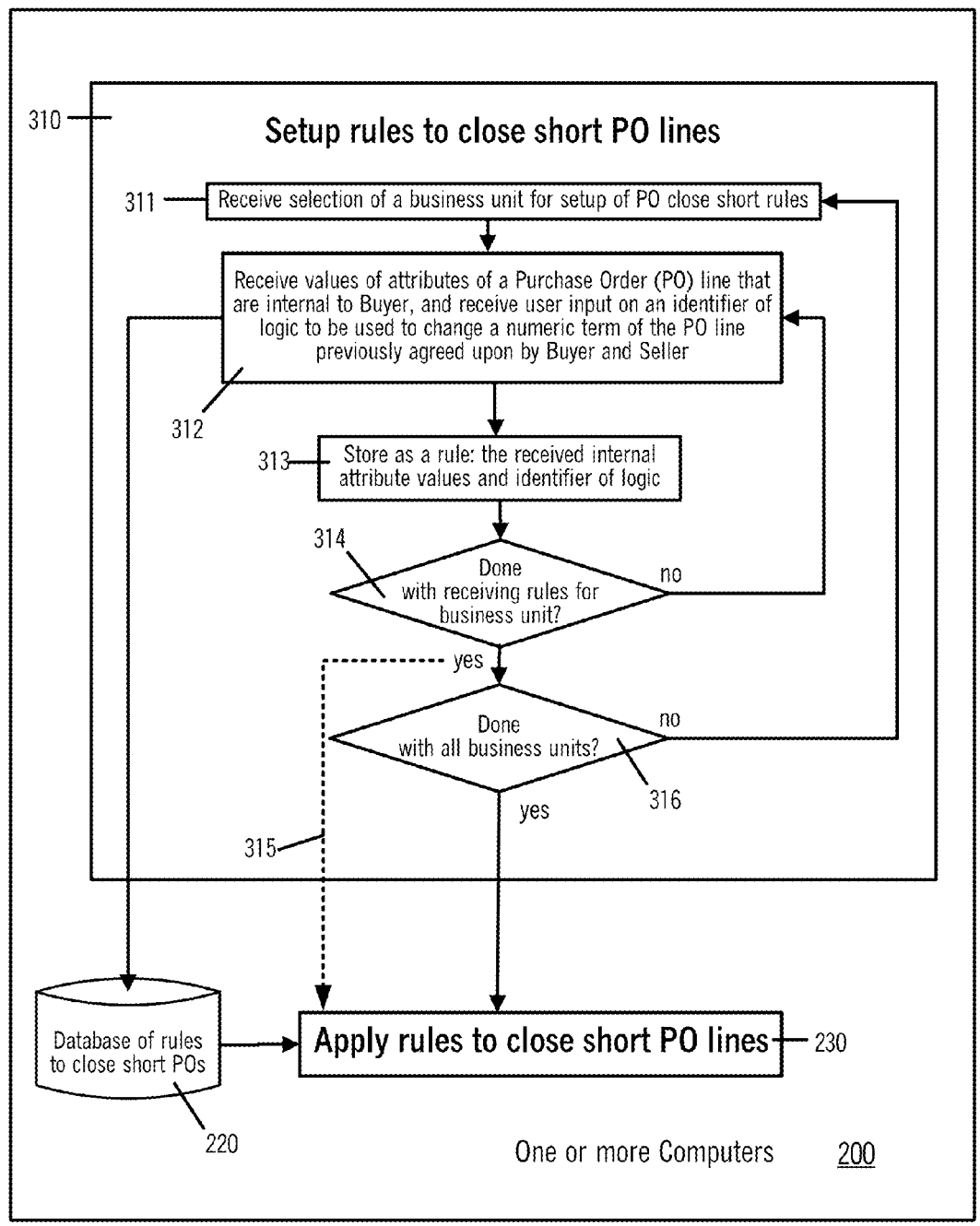
FIG. 3A illustrates, in a flow chart, acts performed by one or more computers 200 by use of one or more processors programmed with a sequence of instructions of software stored in one or more memories, to implement PO close short rule setup, in exemplary embodiments in accordance with the invention.

Change(s) to PO line 241IJ are determined by certain embodiments of one or more computers 200 (FIG. 2A) by use of a rule that is automatically identified from among multiple rules ("PO close short rules"), based on values of attributes of PO line 241IJ. Certain embodiments of one or more computers 200 set up the PO close short rules, which are to be used in changing PO lines, in an operation 310 (FIG. 2A), and store the PO close short rules in a database 220 (FIG. 2A). Depending on the embodiment, database 220 may be accessed via a relational database management system (RDBMS), in the normal manner. A specific manner in which operation 310 is performed (e.g. as illustrated in FIG. 3A) is different in different embodiments. After storage of PO close short rules in database 220, the stored PO close short rules are retrieved from database 220 and applied in an operation 230 (FIG. 2A) by one or more computers 200 to reduce numeric terms in one or more PO lines 241IJ selected by user input indicating buyer's decision to no longer purchase.

During operation 230 to perform PO close short rule application in some embodiments, a purchase order 241I is obtained in an act 231 (FIG. 2A), and the PO 241I may be obtained based on manual input or retrieved automatically from database 220, as follows. Specifically, in some embodiments, purchase order 241I is obtained by receipt of user input in act 231, which user input is received via a keyboard (e.g. by a user typing a unique identifier of the purchase order), or received via a mouse (e.g. by a user navigating a menu of screens in the one or more computers 200 and clicking on a mouse button to identify a selection in a drop down list box). The user input may be provided in act 231, in response to a buyer receiving (either electronically or manually) an invoice (or debit note) from a seller and then navigating through several such purchase orders 241A . . . 241I . . . 241N (with N being the number of purchase orders in database 220) to provide the user input in act 231. In other embodiments, purchase order 241I (FIG. 2A) is obtained automatically, e.g. during an year-end close operation, by looping over all purchase orders 241A-241N, e.g. on performance of act 243 (described below) by the one or more computer(s) 200. So, a specific manner in which purchase order 241I is obtained in act 231 can be different, in different embodiments.

After act 231, a specific line 241IJ in the purchase order 241I is obtained e.g. retrieved from among several such PO lines 241IA . . . 241IJ . . . 241IM that are included in a list in the purchase order 241I. One or more computer(s) 200 may loop over PO lines 241IA . . . 241IJ . . . 241IM to obtain a specific line 241IJ in act 232, e.g. during the year-end close operation. In this situation, line 241IJ may or may not have been previously selected for close short processing and thus the one or more computer(s) 200 go to act 233 to check if a flag to close short this specific line 241IJ is set, e.g. whether or not the check box in column 457 (FIG. 4E) is checked. If the answer is no, the one or more computer(s) 200 return from act 233 back to act 232 (described above). If the answer is yes, the one or more computer(s) 200 go from act 233 to act 234 as described below.

In some embodiments, the one or more computer(s) 200 perform act 232 (FIG. 2A) in response to user input indicating selection of the specific line 241IJ in the purchase order 241I for close short processing. For example, a user 411 (FIG. 4A) that creates purchase order 241I may notify another user 441 that is to process receipt of the item, via an email message, to close the specific line 241IJ on receipt. Thus, on receipt of the item, user 441 may use a command 456 (FIG. 4A) to initiate operation 230 in act 232 (FIG. 2A). Alternatively, user 411 may directly mark PO line 241IJ as being ready for close short processing, e.g. in column 457 in FIG. 4E. A specific manner in which PO line 241IJ is selected in act 232 can be different in different embodiments.

In act 234, values of certain attributes a selected PO line 241IJ are used to identify a PO close short rule from among multiple such rules stored in a database 220. In doing so, the one or more computers 200 of some embodiments may check if values of internal attributes of PO line 241IJ match corresponding values of any rule among a group of rules of a specific business unit ("plurality of rules"). The attributes whose values are used in act 234 are internal to a buyer (and normally not transmitted to a seller's computer). The attributes are picked ahead of time based on their indication of specific conditions under which a buyer typically determines whether the PO line (or a schedule therein) can be processed in certain ways, e.g. closed.

One example of such an internal attribute A indicates that processing of receipt of an item against a PO line is to be done by amount only (in units of money), e.g. when the item is a service. Another example of such an internal attribute I indicates that physical receipt of goods is required. Still another example of such an internal attribute N indicates that matching is required between a PO line's schedule, receipt of goods/services (and optionally seller's invoice, for a 3-way match). Each internal attribute I to be used in rule identification in act 234 is picked during design stage for having a handful of values I1 . . . Ij . . . Im (e.g. M=2-5 values) and the number of attributes A . . . I . . . Z is also a handful in number (e.g. N=2-5 attributes) so that all possible combinations of attribute values A1 . . . Ij . . . Zm identify a manageable number of the multiple rules e.g. 20-30 rules.

In some embodiments, the one or more computers 200 select multiple rules ("plurality of rules" or "group of rules") from among all PO close short rules in database 220, e.g. based on an identifier of a specific business unit 321 (FIG. 4B) that is identified in purchase order 241I. In the just-described example, the specific business unit is identified for having originated purchase order 241I, and/or as a recipient of goods and/or services in the purchase order 241I. Hence, in some embodiments, a plurality of rules which are associated with business unit 321 (in turn identified in the purchase order 241I) are retrieved from database 220 in act 234, and then attribute values of the PO line 241IJ are used to look up and thus identify a specific rule in act 234.

Depending on the embodiment, in act 234, a rule may be identified from among a plurality of rules, e.g. by software instructions to use each value of N internal attributes of a PO line 241IJ as indices to look up an N-dimensional table to retrieve a specific rule. Alternatively, values of the N internal attributes of a PO line 241IJ may be compared by a comparator (in hardware or software or combination thereof) with corresponding attribute values associated with each rule, e.g. in an SQL query, to retrieve a specific rule. Thus, means for identifying a rule from among a plurality of rules can be different in different embodiments, all of which use a plurality of values of a corresponding plurality of attributes of the PO line, to retrieve a specific rule matching the PO line. For example, rule 336 in FIG. 3C is identified by act 234 for having identical values of corresponding attributes of PO line 241IJ are as follows: attribute "Receiving Required Option" has value "Required", attribute "Amount Only Option" has value yes (as indicated by a check), and attribute "Match Line Option" has value "Full Match."

When a rule that is identified in act 234 (FIG. 2A) is disabled (e.g. see row 337 in FIG. 3C), the PO line 241IJ is kept unchanged, i.e. there are no changes to any numeric terms and the one or more computers 200 go to optional act 242. When a rule identified in act 234 is not disabled, several embodiments of computer(s) 200 go from act 234 to act 237 either directly, or via a "no" branch of act 235 that may be performed or not performed depending on the embodiment (which may or may not support PO line cancellation).

Embodiments that support PO line cancellation implement act 235, wherein the one or more computer(s) 200 check if a preset condition is met. In some embodiments, the preset condition used in act 235 is as follows: is the logic identified in the rule by act 234 anything other than disabled, and has the PO line not had any activity (Receiving/Invoicing/Matching). If the answer in act 235 is no, then act 237 is performed. If the answer in act 235 is yes, then act 236 is performed to cancel the specific line 241IJ in the purchase order 241I, followed by act 239. For example if PO line 241IJ is marked for close short processing, and it has no activity (e.g. no receipts yet), and the rule's logic is "Received Quantity" then PO line 241IJ is canceled. In act 239, the one or more computer(s) 200 which include computer(s) 400 (FIG. 4A) notify the seller's computer(s) 500 about cancellation of the specific line 241IJ in purchase order 241I, to prevent future receipt of the item identified in line 241IJ.

A preset condition which is used in act 235 to cancel a PO line 241IJ can be different in different embodiments. For example, if a purchase order 241I has two PO lines, and if a first PO line is marked for close short processing (e.g. in column 457 in FIG. 4E), and a second PO line that is not marked for close short processing has its item received partially, the preset condition in act 235 is met by the first PO line which is therefore canceled in act 236. As another example, if a purchase order 241I has two PO lines, and if a first PO line is marked for close short processing (e.g. in column 457 in FIG. 4E), and a second PO line that is not marked for close short processing, and if both items have not been received for a number of days specified in the close days field 252 (FIG. 2B), the preset condition in act 235 is met by the first PO line which is canceled.

Act 237 (FIG. 2A) uses a user-specified logic, which is identified by a specific rule identified in act 234, to determine a new value of the numeric term, to be used in changing of the PO line 241IJ in act 238. As shown in FIG. 2A, a numeric term may be either quantity or amount, and a new value thereof may be determined based on a corresponding value in receipts, or invoices, or match depending on the user-specified logic (also called "close short set" option) identified in the rule. For example, when rule 338 in FIG. 3C is identified in act 234 from among multiple rules by the attribute values of the PO line 241IJ then act 237 uses the user-specified logic, to determine a new value based on "Vouchered Quantity".

Figure 4A:
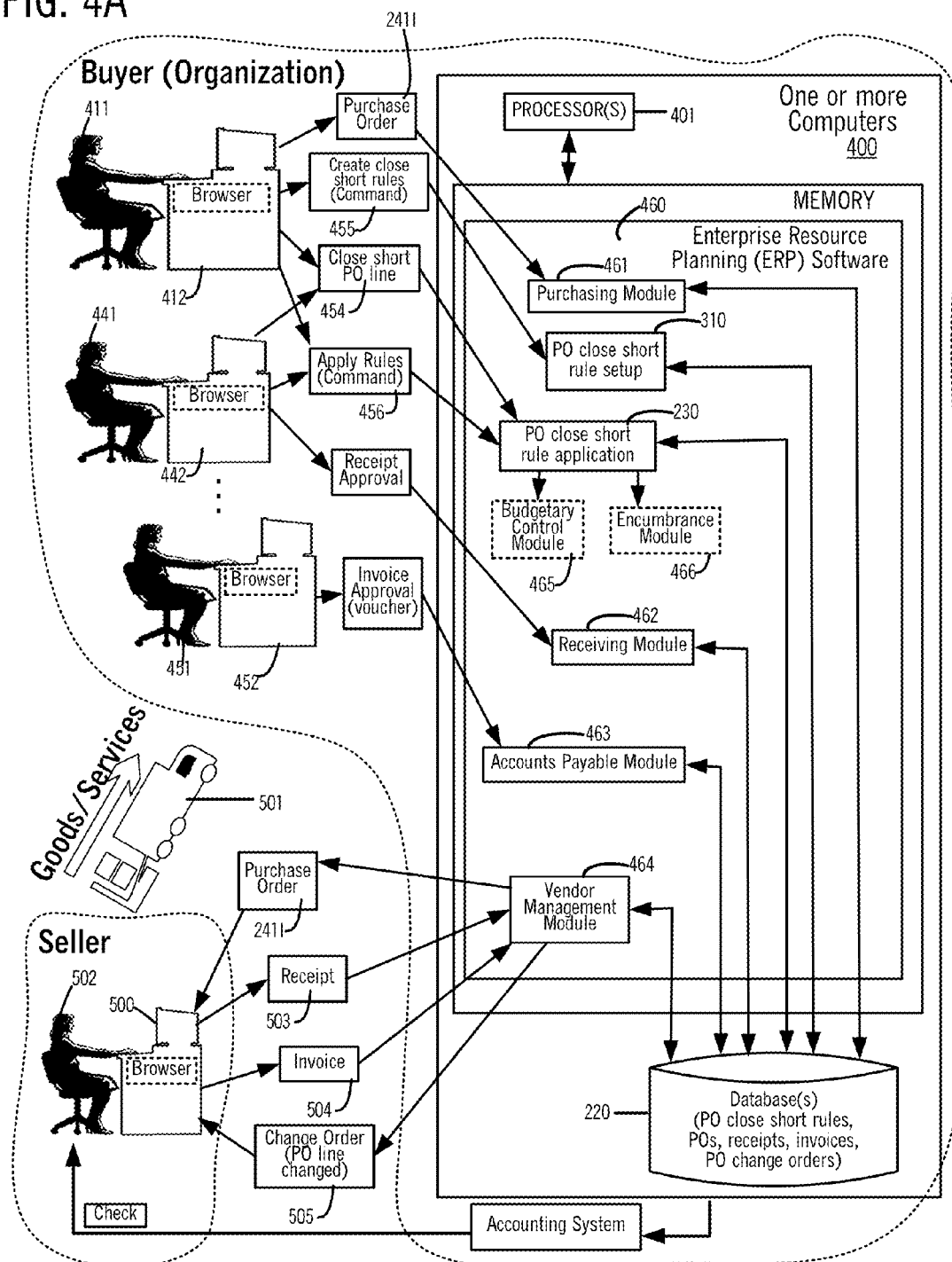
FIG. 4A shows, in a data flow diagram, processing of purchase orders, receipts, invoices, invoice approvals and PO modifications and closures, by one or more computers 200 of FIGS. 2A and 3A, in some illustrative embodiments.
Figure 4F:
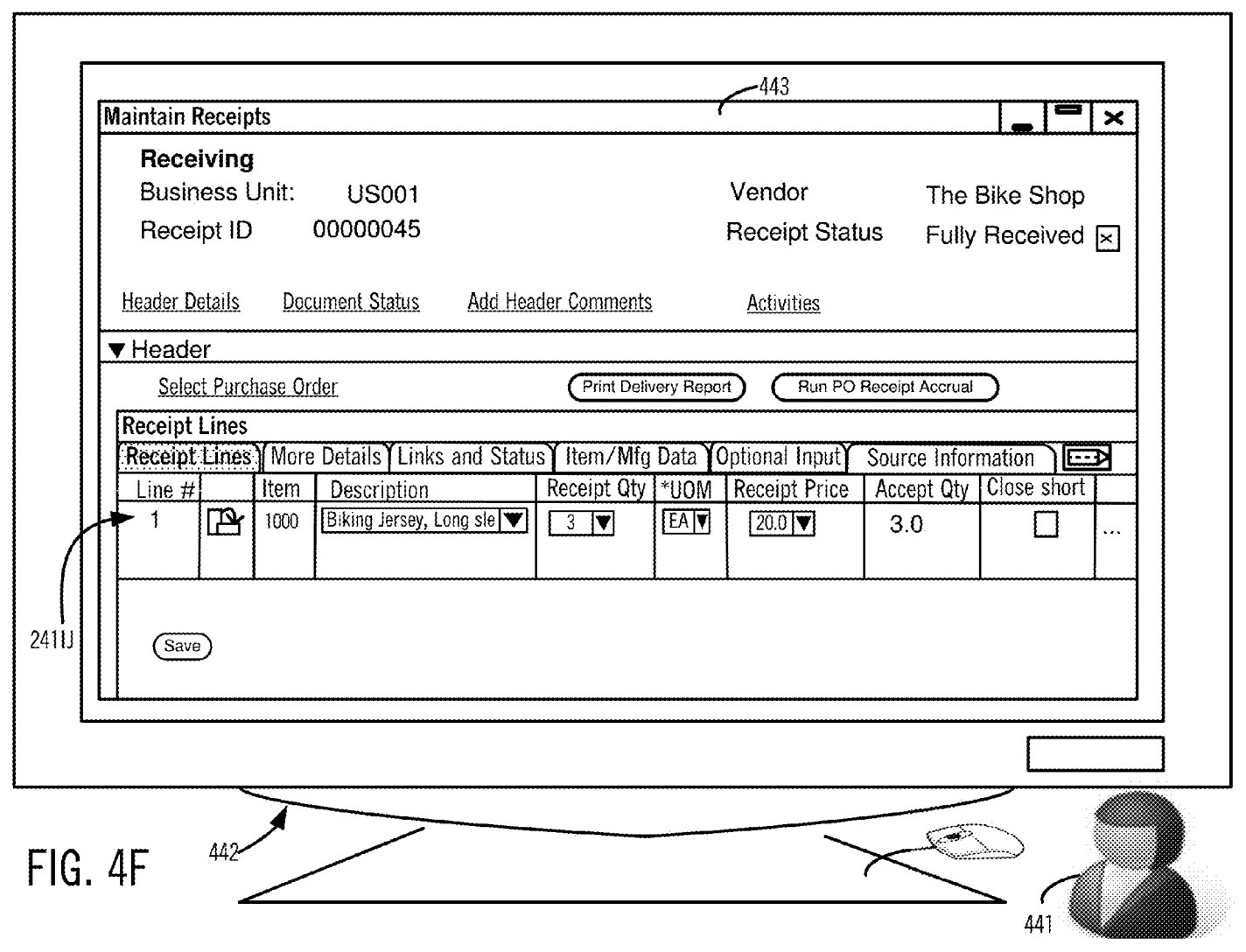
Figure 4G:
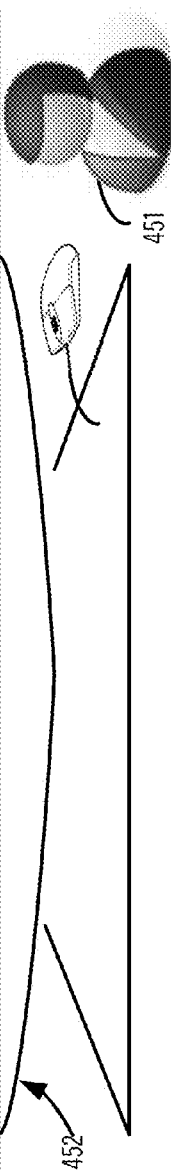

In performing act 237, a preexisting value of the numeric term in PO line 241IJ is compared with a new value determined by use of the logic, and when there has been an over-delivery or correct delivery (i.e. when the new value is greater than or equal to the preexisting value), the "yes" branch is taken from act 237 and the PO line 241IJ is kept unchanged, and the one or more computers 200 go to optional act 242. In performing act 237, when there has been an under-delivery (i.e. when the new value is less than the preexisting value), then the one or more computers 200 go to act 238. In act 238, the new value is used to change the numeric term in PO line 241IJ (FIG. 4B). For example, a preexisting value of "10" of the PO quantity 481 in PO line 241IJ (FIG. 4B) is identified in a change order to be replaced by a new value of "3" (currently vouchered) as accepted quantity 482 (FIG. 4G). When the change order is processed (e.g. also in act 238), the PO line 241IJ is closed short. Thereafter, the one or more computers 200 go to act 239 wherein the change is transmitted to the seller, e.g. as a change order or alternatively as a modified purchase order (with the new value). The transmission to seller in act 239 may be done electronically (by sending a signal to the seller's computer 500 from buyer's computer(s) 400) or in paper (by printing and mailing).

Instead of a "Vouchered Quantity" logic currently identified in rule 338 (FIG. 3C), another such logic may be specified therein by a user, e.g. via user input in a drop-down list (or in a list of values) as described below. Thus, a specific logic to be used in act 237, to determine the new value, can be specified by a human user employed by the buyer differently for different PO close short rules, depending on the embodiment. Regardless of the logic used, in most embodiments, a new value is determined in act 237 to be less than a pre-existing value of the numeric term. In an illustrative example, the numeric term is quantity of goods and/or services, and the new value thereof is determined in act 237 by the user-specified logic to be the quantity delivered as identified in one or more receipt(s) currently associated with the specific PO line 241IJ. In the just-described example, the new value is less than a pre-existing value of this numeric term in the specific PO line 241IJ, which identifies the quantity of goods and/or services previously agreed upon as being deliverable, by the parties identified in the purchase order 241I as the buyer and seller.

At any time before, during, or after act 239, the one or more computers 200 may perform an optional act 240 to compute a liquidated amount of funds that have been released by closing the PO line 241IJ. For example, a difference between the pre-existing value and the new value of the quantity of goods and/or services is multiplied by price to obtain a liquidated amount in act 240. Also in act 240, the liquidated amount is supplied as input to one or more modules, such as a budgetary control module 465 (FIG. 4A) and/or an encumbrance module 466 (FIG. 4A). The one or more computers 200 may or may not include a budgetary module and/or an encumbrance module, depending on the embodiment. Embodiments that include a budgetary control module 465 (FIG. 4A) and/or an encumbrance module 466 (FIG. 4A) implement such module(s) in any manner known in the art, e.g. as described in US Patent Application Publication 2013/0282535 by Bhaowal et al. incorporated by reference above.

Notification of a liquidated amount to an encumbrance module is implemented in act 240 of some embodiments by one or more computers 200 using an encumbrance journal entry in a purchasing sub-ledger. In certain embodiments, one or more computers 200 initially record details of a purchase order line 241IJ in a sub-ledger (e.g. on creation of the purchase order line), followed by moving the recorded sub-ledger entries into a general accounting ledger when the purchase order line 241IJ is marked closed in act 240. However, use of a sub-ledger is not required in some embodiments. Hence, a specific manner in which purchase order line 241IJ is marked closed is different in different embodiments.

After acts 237, 239 or via branch 248, the one or more computers 200 may perform an optional act 242. Act 242 is not performed in certain embodiments in which operation 230 is initiated in act 232 by user 441 via command 456 (FIG. 4A). In other embodiments, e.g. when act 231 has been performed, there may be multiple PO lines in the obtained purchase order 241I which need to be processed, and in such embodiments act 242 is performed. In act 242, the one or more computers 200 check whether there are any more lines in the selected purchase order 241I which are yet to be processed and if the answer is yes then control transfers to act 232 (described above, wherein one of the unprocessed PO lines is obtained to apply a close short rule thereon). If the answer in act 242 is no, i.e. that there are no more PO lines to process, then control transfers to optional act 243. In act 243, the one or more computers 200 check whether all POs have been processed, and if the answer is no, i.e. that there are one or more POs that are still to be processed, then control transfers to act 231 (described above). When the answer in act 243 is yes, the PO close short rule application operation 230 has been completed. Subsequently the user may initiate a PO close operation 245, to close one or more purchase orders in which numeric terms have been changed by operation 230.

Performance of operation 245 is optional, and may be performed when operation 230 is initiated by a command to run a process, to close short all purchase orders of a specific business unit, e.g. as illustrated by screens 250 and 260 (FIGS. 2B and 2C). More specifically, FIG. 2B illustrates a "Close Short" screen 250 for receipt of user input, including a user interface control 251, to select a specific business unit identified as "US001" and an input box 252 to identify the number of close days. Close days is a number of days, relative current date, prior to which an item must have been received, for use in performing operation 230 (i.e. PO close short rule application). Screen 250 also includes a run control identifier 253 which is used for audit. In response to clicking the "Run" button in screen 250 (FIG. 2B), the user is presented with screen 260 (FIG. 2C), which shows a list of processes to run, including a process 261 which when run (by the user clicking the "OK" button) performs operation 230 (described above). A specific manner of initiating process 261 illustrated via screens 250 and 260 can be different in different embodiments.

Process 261, when executed by one or more computers 200, repeatedly performs act 231 (FIG. 2A) in a loop (via optional act 243) to select all open purchase orders of the user-specified business unit identified as "US001" in user interface control 251. Process 261 may alternatively be performed by omitting optional act 243, e.g. when invoked on a single purchase order by user 441. Regardless of how process 261 is invoked, in some embodiments the process generates one or more change order(s), to be used to change purchase orders (as per act 238 described above), in response to user input via screen 270 (illustrated in FIG. 2D).

In some embodiments, the one or more computers 200 are programmed to perform operation 310 (FIG. 2A) to set up PO close short rules for a business unit as illustrated in FIG. 3A. Specifically, in an act 311, one or more computers 200 receive identification of a business unit, to be associated with a plurality of rules ("PO close short rules"). For example, computer(s) 200 may receive identification of a business unit via a screen 320 (FIG. 3B) in a set of screens normally used in an enterprise resource planning (ERP) software to define a business unit, e.g. with the user-specified business unit identified as "US001" in field 321. In screen 320 (FIG. 3B) the user may optionally select a previously set up group of PO close short rules in a control 322 by selecting a unique identifier thereof, e.g. the name "STANDARD." By checking a check box 323 in screen 320, a user may indicate that logic normally identified by a PO close short rule for a specific PO line is to be over-ridden by a different logic. The different logic may be manually specified, on a PO line by PO line basis, e.g. in a screen that displays a report of all PO lines to be close short processed and logics identified by PO close short rules (e.g. as identified by act 234, described above).

In an act 312 (FIG. 3A), the one or more computers 200 may receive the plurality of rules if not previously set up, or alternatively receive changes to the plurality of rules that may be previously set up. More specifically, in act 312, one or more computers 200 receive information on a plurality of rules, including values of one or more internal attributes (i.e. one or more attributes internal to a buyer) which are to be matched to corresponding attributes of a Purchase Order (PO) line, and an identifier of logic to be used to change numeric term(s) (i.e. quantity and/or amount of money previously agreed upon by the buyer and the seller).

A specific manner in which act 312 is performed, to set up or change a plurality of rules for use in close short processing, depends on the embodiment, although certain embodiments receive user input in act 312 via a screen, such as screen 330 illustrated in FIG. 3C. Specifically, screen 330 illustrates a specific plurality of rules identified by the name "STANDARD" (in field 341), displayed in a table 331, with each row therein including a rule identifier in a left-most column 332, and three internal attributes in three corresponding columns 333, and a logic identifier in the right-most column 334.

More specifically, in the embodiment illustrated in FIG. 3C, screen 330 shows that a rule with a unique identifier of "1" shown in row 335 of table 331 identifies three internal attributes in columns 333, which have the three values shown in table A below.

TABLE A

| Name of Internal Attribute | Value of Internal Attribute |
| --- | --- |
| Receiving Required Option | Required |
| Amount Only Option | No |
| Match Line Option | Evaluated Receipt Settlement |

Depending on the embodiment, each of the above-described three internal attributes can have any number of values. In the example illustrated in FIG. 3C, each of the internal attributes has a number of values shown in table B below.

TABLE B

| Name of Internal Attribute | Number of Values |
| --- | --- |
| Receiving Required Option | 3 |
| Amount Only Option | 2 |
| Match Line Option | 3 |

Hence, there are a total of 2×3×3 or 18 combinations of values, of the internal attributes in this example, and these 18 values are used in several embodiments to form 18 rules for each business unit, whereby table 331 in FIG. 3C has 18 rows, and each row specifies a PO close short rule. In addition to the above-described values, table 331 in FIG. 3C includes an additional value, whereby a user can disable any of these 18 rules, e.g. as illustrated in row 337.

In the embodiment illustrated in FIG. 3C, the internal attribute of "Amount Only Option" in table 331 is a line level attribute that relates to the type of item as internally identified by the buyer. Specifically, the internal attribute of "Amount Only Option" can have one of two values in some embodiments, as follows (1) "☐" denoting "no" or (2) "☑" denoting "yes". In some embodiments, the meanings of the two values of the internal attribute of "Amount Only Option" are same as described on page 732 in Chapter 28 of the book "PeopleSoft Enterprise Purchasing 9.1 PeopleBook", as follows. When the "Amount Only Option" attribute of a PO line has the value ☑, the PO line is designated as an amount-only line, the amount value is available for entry by user input in the PO line, any amount entered by the user input is automatically used by the system (e.g. computer(s) 400) as a schedule's price and amount, and the quantity value is made unavailable for user input and automatically set to be same as the line amount. The value ☑ of this attribute is normally used for items that are services, and typically each PO line includes a single schedule. When the item in the PO line is goods, the "Amount Only Option" attribute of a PO line is to be left unchecked, i.e. the value "☐".

In the embodiment illustrated in FIG. 3C, an internal attribute of "Receiving Required Option" in table 331 is another line level attribute that relates to how receipt of an item is internally processed by the buyer. Specifically, the attribute of "Receiving Required Option" can have one of three values in some embodiments, as follows (1) "Receiving Required", (2) "Receiving is Optional", or (3) "Receiving Not Required." In some embodiments, the meanings of the three values of the internal attribute of "Receiving Option" are same as described on page 62 in Chapter 4 of the book "PeopleSoft Enterprise Purchasing 9.1 PeopleBook", as follows. When the "Receiving Required Option" attribute of a PO line has the value "Receiving Required", accounts payable matches receipt lines to PO lines and the system (e.g. computer(s) 400 executing ERP software) accrues the receipt, when the item is received in screen 443 (FIG. 4F). When the "Receiving Required Option" attribute of a PO line has the value "Optional", accounts payable does not matches receipt lines to PO lines and the system does not accrue the receipt, when the item is received in screen 443 (FIG. 4F). When the "Receiving Required Option" attribute of a PO line has the value "Receiving Not Required", accounts payable matching and receipt accrual are not applicable, when the item is received in screen 443 (FIG. 4F).

In the embodiment illustrated in FIG. 3C, the internal attribute of "Match Line Option" in table 331 is a schedule level (or delivery level) attribute that relates to a method for matching and verifying a seller's charges. In most situations, all schedules in a specific PO line have a common value for the "Match Line Option" attribute, and hence this common value can be treated as a single line level attribute of the specific PO line. In other situations, a PO line has a number of values for the "Match Line Option" attribute, for an identical number of schedules therein. The attribute of "Match Line Option" can have one of three values in some embodiments, as follows (1) "Full Match", (2) "Evaluated Receipt Settlement" ("ERS"), or (3) "No Match." The meanings of the three values of the internal attribute of "Match Line Option" are as follows. In some embodiments, when the "Match Line Option" attribute of a PO line has the value "Full Match", the system matches the PO line to a line in a seller's invoice. In such embodiments, when the "Match Line Option" attribute of a PO line has the value "No Match", the system does not match the PO line to the seller's invoice. In some embodiments, when the "Match Line Option" attribute of a PO line has the value "ERS", the system uses evaluated receipt settlement to match a receipt line based on purchase order header match control (e.g. to generate a voucher without requiring an invoice).

Although three internal attributes are illustrated for a rule in FIG. 3C, fewer internal attributes or more internal attributes may be used to set up PO close short rules, depending on the embodiment. Moreover, specific internal attribute(s) which are used in a PO close short rule can be different, depending on the embodiment. In addition to the above-described internal attributes, Rule 1 shown in row 335 of table 331 in FIG. 3C, has in the right-most column 334 the identifier "Received Quantity" which identifies a specific logic to be used in changing a numeric term of the PO line, namely determine a new value of the ordered quantity to be same as the quantity of goods which have been received.

The logic identifier "Received Quantity" shown in FIG. 3C in column 334 at row 335 can be changed by a user, e.g. by operating a mouse to select one identifier from a group of logic identifiers displayed in a drop-down box, or list of values. The values of the three internal attributes shown in columns 333 cannot be changed by the user, because each unique combination of values of these three internal attributes is used to form one specific rule. One illustrative embodiment is set up with 18 rules, as shown in table C, with the right-most column showing user-selectable options identifying a logic to be used in closing a PO line which has internal attribute values ("PO specific" values) that match values ("rule specific" values) shown in the three left columns of table C below. An asterisk in the right-most column in table C below indicates a default option with which a rule is initialized, prior to receipt of user input specifying a different logic.

In some embodiments, a numeric term which is changed in a PO line depends on the specific logic identified by the PO close short rule. The logics in the table C below change in a PO line, a numeric term that is expressed only in one of (units of money or units of quantity). In a first type of rule in table C below, when an internal attribute is amount only, the numeric term is expressed only in units of money (as shown by even numbered rules, such as Rules 2, 4, 6, 8 . . . ). In a second type of rule in table C below, when the numeric term is expressed only in units of quantity, one of the internal attributes is related to receiving and another of the internal attributes is related to matching (as shown by odd numbered rules, such as Rules 1, 3, 5, 7 . . . ). More specifically, in table C below, Rule 1 (in the first row) changes the numeric term of quantity, and Rule 2 changes the numeric term of amount of money, and a specific change that is made depends on the user's selection of logic, as follows.

When setting up Rule 1 as per act 312 (FIG. 3A), a user is given four choices of logics from among which to select a specific logic to be invoked, when the three internal attribute values shown in the first row of table C below match a PO line's values of internal attributes, as follows: a first logic that identifies a sum of receipt quantity, a second logic that identifies a matched quantity, a third logic that identifies greater value of: matched quantity or sum of receipt quantity, or a fourth logic that identifies greater value of: sum of vouchered quantity or sum of receipt quantity. These four choices are displayed to the user when the user operates the mouse after placing the curser in the right-most column 334 in FIG. 3C. On doing so, the one or more computers 200 display a first identifier (e.g. "Received Quantity" or "RQ") of the first logic, a second identifier (e.g. "Matched Quantity" or "MQ") of the second logic, a third identifier (e.g. "RMGQ") of the third logic, or a fourth identifier (e.g. "RVGQ") of the fourth logic; and a fifth identifier (e.g. "NA") indicating disabling the rule. No logic to modify an amount is shown for user selection in setting up Rule 1, because the amount only option attribute has the value of "No". Instead, such logics are shown in setting up Rule 2 because the amount only option attribute has the value of "Yes", as follows.

When setting up Rule 2 as per act 312 (FIG. 3A), the user has three choices of logics from among which to select a specific logic to be invoked, when the three internal attribute values shown in the second row of table C below match a PO line's values of internal attributes, as follows: a first logic that identifies a sum of receipt amount, of money to be paid to the seller, a second logic that identifies a matched amount, of money to be paid to the seller or a third logic that identifies greater value of: the matched amount or the sum of receipt amount. Various such logics that are displayed to a user in setting up a rule based on that rule's values of the internal attributes, are illustrated in table C below, for each of the 18 rules in one embodiment.

TABLE C

| Rule ID | Amount Only Option | Receiving Option | Match Line Option | LOGICs available for user selection, for use in determining how a numeric term is to be reduced, to close short a PO (also called Close Short Set Option) |
|---|---|---|---|---|
| 1 | No | Receiving Required | Full Match | RQ) Sum of Receipt Quantity * MQ) Matched Quantity RMGQ) Greater value of Matched Quantity or the Sum of Receipt Quantity NA) Disable |
| 2 | Yes | Receiving Required | Full Match | RA) Sum of Receipt Amount * MA) Matched Amount RMGA) Greater value of Matched Amount or Sum of Receipt Amount NA) Disable |
| 3 | No | Receiving Required | ERS | RQ) Sum of Receipt Quantity * MQ) Matched Quantity VQ) Sum of Vouchered Quantity RMGQ) Greater value of Matched Quantity or the Sum of Receipt Quantity RVGQ) Greater value of the Sum of Vouchered Quantity or the Sum of Receipt Quantity NA) Disable |
| 4 | Yes | Receiving Required | ERS | RA) Sum of Receipt Amount * MA) Matched Amount VA) Sum of Vouchered Amount RMGA) Greater value of Matched Amount or Sum of Receipt Amount RVGA) Greater value of the Sum of Vouchered Amount or the Sum of Receipt Amount NA) Disable |
| 5 | No | Receiving Required | No Match | RQ) Sum of Receipt Quantity * VQ) Sum of Vouchered Quantity RVGQ) Greater value of the Sum of Vouchered Quantity or the Sum of Receipt Quantity NA) Disable |
| 6 | Yes | Receiving Required | No Match | RA) Sum of Receipt Amount * VA) Sum of Vouchered Amount RVGA) Greater value of the Sum of Vouchered Amount or the Sum of Receipt Amount NA) Disable |

TABLE C-continued

| Rule ID | Amount Only Option | Receiving Option | Match Line Option | LOGICs available for user selection, for use in determining how a numeric term is to be reduced, to close short a PO (also called Close Short Set Option) |
|---|---|---|---|---|
| 7 | No | Receiving is Optional | Full Match | RQ) Sum of Receipt Quantity<br>MQ) Matched Quantity *<br>RMGQ) Greater value of Matched Quantity or the Sum of Receipt Quantity<br>NA) Disable |
| 8 | Yes | Receiving is Optional | Full Match | RA) Sum of Receipt Amount<br>MA) Matched Amount *<br>RMGA) Greater value of Matched Amount or Sum of Receipt Amount<br>NA) Disable |
| 9 | No | Receiving is Optional | ERS | RQ) Sum of Receipt Quantity *<br>MQ) Matched Quantity<br>VQ) Sum of Vouchered Quantity<br>RMGQ) Greater value of Matched Quantity or the Sum of Receipt Quantity<br>RVGQ) Greater value of the Sum of Vouchered Quantity or the Sum of Receipt Quantity<br>NA) Disable |
| 10 | Yes | Receiving is Optional | ERS | RA) Sum of Receipt Amount *<br>MA) Matched Amount<br>VA) Sum of Vouchered Amount<br>RMGA) Greater value of Matched Amount or Sum of Receipt Amount<br>RVGA) Greater value of the Sum of Vouchered Amount or the Sum of Receipt Amount<br>NA) Disable |
| 11 | No | Receiving is Optional | No Match | RQ) Sum of Receipt Quantity *<br>VQ) Sum of Vouchered Quantity<br>RVGQ) Greater value of the Sum of Vouchered Quantity or the Sum of Receipt Quantity<br>NA) Disable |
| 12 | Yes | Receiving is Optional | No Match | RA) Sum of Receipt Amount *<br>VA) Sum of Vouchered Amount<br>RVGA) Greater value of the Sum of Vouchered Amount or the Sum of Receipt Amount<br>NA) Disable |
| 13 | No | Do Not Receive | Full Match | MQ) Matched Quantity *<br>NA) Disable |
| 14 | Yes | Do Not Receive | Full Match | MA) Matched Amount *<br>NA) Disable |
| 15 | No | Do Not Receive | No Match | VQ) Sum of Vouchered Quantity *<br>NA) Disable |
| 16 | Yes | Do Not Receive | No Match | VA) Sum of Vouchered Amount *<br>NA) Disable |
| 17 | No | Do Not Receive | ERS | VQ) Sum of Vouchered Quantity<br>NA) Disable * |
| 18 | Yes | Do Not Receive | ERS | VA) Sum of Vouchered Amount<br>NA) Disable * |

After receipt of user input selecting one of the options in the right-most column of table C via screen 330 (FIG. 3C), the above-described group of rules (in this example 18 rules) are stored in one or more memories of the one or more computers 200, in association with an identifier thereof (e.g. called "PO Rule ID") which has the value of "STANDARD". As noted above, this value "STANDARD" is received as user input in another screen 320 (shown in FIG. 3B), and associated therein with a specific business unit, namely US001. In this manner, the one or more computers 200 store a relationship between this group of rules (identified by the identifier "STANDARD") and this business unit (identified by the identifier "US001"). In a similar manner, another set of rules may be identified by another such identifier, and associated with another business unit, whereby another such relationship is stored by the one or more computers 200.

The just-described relationships between business units and corresponding groups of rules, as well as all the rules themselves (also called "PO close short rules") are stored in one or more database(s) 220 (FIG. 4A) by one or more processors 401 (FIG. 4A) that are included by most embodiments in the one or more computers 200 of the type described above. In several such embodiments, database(s) 220 are accessed via commands in a Structured Query Language (SQL) to a relational database management system (RDBMS). A specific RDBMS which is executed by one or more processors 401 depends on the embodiment, although some embodiments use RDBMS software called "ORACLE Database 12c" available from Oracle Corporation of Redwood Shores, Calif., USA. Such database(s) 220 may additionally be used to store one or more types of the documents described above, such as purchase orders 241A-241N, receipts, invoices and PO change orders, depending on the embodiment.

Specifically, in some embodiments, a human user 411 (FIG. 4A) uses a computer 412 to create purchase order 241I described above e.g. via a browser (such as INTERNET EXPLORER or FIREFOX) that displays a screen 413 (FIG. 4B) generated by a purchasing module 461 (FIG. 4A). Purchasing module 461, which is included in ERP software 460 of some embodiments is executed by one or more computer(s) 400 to generate screen 413 (FIG. 4B) as described below. User input from user 411 is initially received in the browser of computer 412 and supplied therefrom to the purchasing module 461 executed by the computer(s) 400, in a normal manner. In certain embodiments of the type illustrated in FIG. 4A, computer(s) 412, 442, 452 and 400 interoperate with one another to implement the one or more computer(s) 200 of the type described above in reference to FIGS. 2A and 3A. Typically, but not necessarily, computer 412 is operated by a human user 411 employed by a buyer's organization as a purchasing agent (e.g. in a business unit), computer 442 is operated by another human user 441 employed by the buyer's organization as a receiving agent (e.g. in a shipping and receiving department), and computer 452 is operated by yet another human user 451 employed by the buyer's organization as an Accounts Payable (AP) clerk (e.g. in an accounting department).

As illustrated in FIG. 4B, screen 413 has several display-only fields, such as Business Unit, PO ID, PO Status, Budget Status. Screen 413 (FIG. 4B) also includes several user-input fields in a header that is common to all PO lines in the currently-displayed PO, such as the following fields: PO Date, Vendor, Buyer, Receipt Status, Dispatch Method, Amount Summary, etc. In addition, screen 413 (FIG. 4B) also includes several user-input fields for one or more PO lines, each of which is displayed in a single row of a table 414. The just-described user-input fields for PO line(s) are displayed as columns of table 414, such as the following: Item, Description, PO Quantity and Price. User 411 of some embodiments operates mouse 415 to provide user input in one or more of the fields of screen 413 (FIG. 4B) to populate PO line 241IJ of the type described above, in the normal manner.

In preparing PO line 241IJ (FIG. 4B), user 411 of some embodiments uses mouse 415 to click to a tab 417 (FIG. 4C) named "Attributes", to access user-input fields of one or more attributes for the PO line 241IJ, which may include internal attributes used to select a rule for close short processing. Specifically, user 411 operates mouse 415 to check or uncheck a box in column 418 (FIG. 4C), for an "Amount Only" attribute, which is an internal attribute as described above. Similarly, user 411 of certain embodiments uses mouse 415 to click to a tab 419 (FIG. 4D) named "Matching", to access user-input fields of certain other attributes of the PO line 241IJ. In one example, user 411 operates mouse 415 to select the value "Don't Match" from a drop-down list box in column 420 (FIG. 4D), for an attribute of "Match Line Option", which is another internal attribute as described above. Moreover, user 411 of such embodiments uses mouse 415 to click to a tab 421 (FIG. 4E) named "Receiving", to access user-input fields of still other attributes of the PO line 241IJ. In one example, user 411 operates mouse 415 to select the value "Required" from a drop-down list box in column 422 (FIG. 4E), for an attribute of "Receiving Required", which is still another internal attribute as described above.

On completing the creation of PO line 241IJ, user 411 may use a mouse 415 to click on a button 431 (FIG. 4B) labeled "Dispatch" to send the purchase order 241I including at least numeric term(s) of PO line 241IJ to the seller (also called vendor) identified therein. When the dispatch method is "Print", the purchase order 241I is printed on a printer (not shown) included in computer 412, and user 411 then puts the printed purchase order paper in an envelope, applies postage and sends it by mail to the seller. In other embodiments, when dispatch method is electronic, purchase order 241I is supplied electronically by computer 412 to computer 500 (FIG. 4A) of seller 502, e.g. via a vendor management module 464 (FIG. 4A) in computer(s) 400 of the buyer's organization. Alternatively, seller 402 may login into module 464 in computer(s) 400 as and when desired, and retrieve the purchase order 241I from database 220.

After receipt of purchase order 241I, seller 502 physically delivers goods and/or services as specified by the numeric terms in PO line 241IJ with a receipt 503 (which may also be physically delivered). In other embodiments, when dispatch method is electronic, receipt 503 is also supplied electronically by computer 500 to computer 400 (FIG. 4A) e.g. via the vendor management module 464. On receiving physical delivery of the goods and/or services, a user 441 may use a computer 442 to approve the seller's receipt, e.g. as illustrated by screen 443 (FIG. 4F) which is generated in such embodiments by a receiving module 462 in computer(s) 400 of the buyer's organization. At this stage user 441 may initiate operation 230 in act 232 to close short the PO line 241IJ, e.g. if user 441 has been notified by user 411 (as described above).

After delivery of goods and/or services, seller 502 submits an invoice to the buyer's organization, e.g. to an accounts payable (AP) clerk, such as user 451. As noted above, when dispatch method is electronic, invoice 504 is also supplied electronically by computer 500 to computer 400 (FIG. 4A) e.g. via the vendor management module 464. User 451 checks that receipt 503 has been approved by user 441, and thereafter use a computer 452 to approve the seller's invoice, e.g. as illustrated by screen 453 (FIG. 4G) which is generated in such embodiments by an accounts payable (AP) module 463 in computer(s) 400 of the buyer's organization.

At any stage, if user 411 decides that no further deliveries are to be received for the PO line 241IJ, user 411 may provide user input 454 (FIG. 4A) in the form of a command to close short the PO line 241IJ (e.g. in column 457 in FIG. 4E) following which operation 230 for PO close short rule application is performed by computer(s) 400, as described above in reference to FIG. 2A. Prior to a first performance of operation 230, user 411 (FIG. 4A) may provide user input 455 in the form of a command to perform operation 310 (FIG. 3A), to initiate creation and storage of PO close short rules in database 220 (FIG. 4A). Moreover, user 411 may provide user input 456 (FIG. 4A) in the form of a command to initiate closure of all POs, whereby operation 230 for PO close short rule application is performed by computer(s) 400, which is optionally followed by operation 245 as described in reference to FIG. 2A.

Figure 5A:
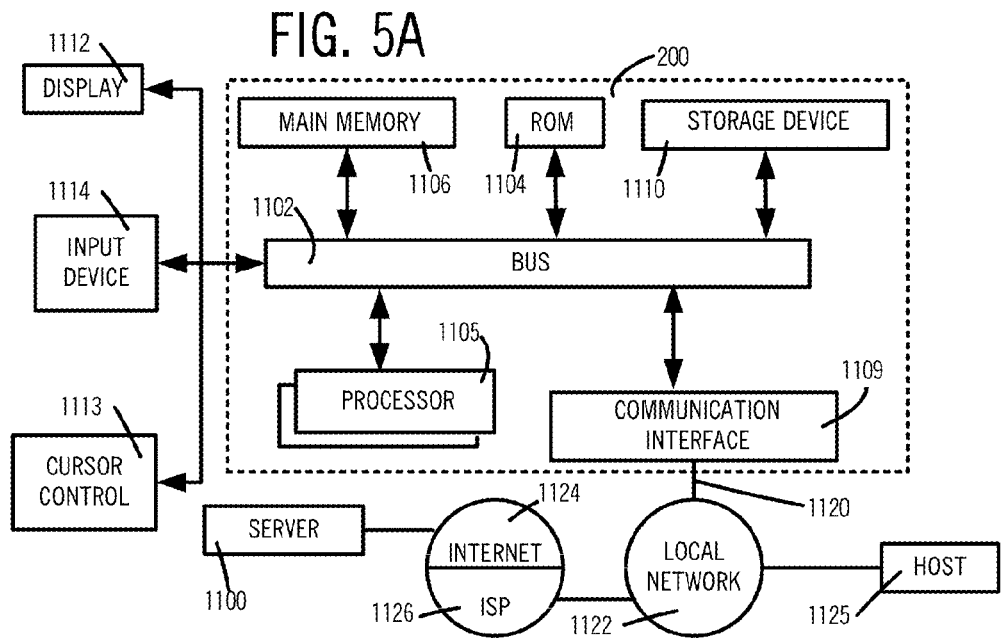
FIGS. 5A and 5B illustrate, in block diagrams, hardware and software portions of one or more computers 200 that perform one or more acts illustrated in FIGS. 2A and 3A in some embodiments.

The act(s) in PO close short rule application 230 illustrated in FIG. 2A and the act(s) in PO close short rule setup 310 as illustrated in FIG. 3A may be used to program one or more computer(s) 200 each of which may be implemented as illustrated in FIG. 5A and discussed below. Thus, computer(s) 412, 442, 452 used by employee(s) as well as computer(s) 400 in a buyer organization may each be implemented to include one or more or all of modules 461-466 (FIG. 4A) in combination with one or more hardware components described in reference to computer(s) 200 below.

Specifically, computer(s) 200 includes a bus 1102 (FIG. 5A) or other communication mechanism for communicating information, and one or more processor(s) 1105 coupled with bus 1102 for processing information. Computer(s) 200 uses (as the above-described memory) a main memory 1106, such as a random access memory (RAM) or other dynamic storage device, coupled to bus 1102 for storing information and instructions (e.g. to perform act(s) of FIGS. 2A and 3A) to be executed by processor(s) 1105 (which in some embodiments implement processor(s) 401 of FIG. 4A).

Main memory 1106 (FIG. 5A) also may be used for storing temporary variables or other intermediate information during execution of instructions (e.g. in modules 461-466) by processor 1105. Computer(s) 200 further includes a read only memory (ROM) 1104 or other static storage device coupled to bus 1102 for storing static information and instructions for processor 1105, such as software in the form of a browser. A storage device 1110, such as a magnetic disk or optical disk, is provided and coupled to bus 1102 for storing information and instructions.

Computer(s) 200 (FIG. 5A) may be coupled via bus 1102 to a display device or video monitor 1112 such as a cathode ray tube (CRT) or a liquid crystal display (LCD), for displaying information (e.g. via a browser) to a computer user (e.g. user 411, 441 or 451) on the display 1112. An input device 1114, including alphanumeric and other keys (e.g. of a keyboard), is coupled to bus 1102 for communicating information (such as user input, e.g. from any user 411, 441 or 451) to processor 1105. Another type of user input device is cursor control 1116, such as a mouse 415 (described above), a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane. In addition to display device 1112, computer(s) 200 may include a speaker (not shown) as another output device for use by processor 1105 in interacting with any of user(s) 411, 441 or 451.

As described elsewhere herein, execution of ERP software 460 (FIG. 4A) in computer(s) 200 (FIG. 5A) may be implemented by one or more processor(s) 1105 executing one or more sequences of one or more instructions that are contained in main memory 1106. Such instructions may be read into main memory 1106 from another non-transitory computer-readable storage medium, such as storage device 1110. Execution of the sequences of instructions contained in main memory 1106 causes processor 1105 to perform PO close short rule application 230 as illustrated in FIG. 2A and/or to perform PO close short rule setup 310 as illustrated in FIG. 3A.

In alternative embodiments, hard-wired circuitry may be used in place of or in combination with software instructions in modules 461-466 to perform act(s) illustrated in FIGS. 2A and 3A, as will be readily apparent to a skilled artisan in view of the description herein. Specifically, means for identifying a rule among a plurality of rules are implemented in some embodiments by one or more structures similar or identical to a binary comparator, such as TTL 7485 from Texas Instruments, or 74HC/HCT85 from Philips Semiconductors. Similarly, means for using a user-specified logic identified by a rule to determine a new value of a numeric term which is less than a preexisting value may be implemented in some embodiments by an arithmetic logic unit (ALU) in a central processing unit (CPU) of a processor in a computer.

The term "non-transitory computer-readable storage medium" as used herein refers to any non-transitory storage medium that participates in providing instructions to processor 1105 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computer(s) 200. Volatile storage media includes dynamic memory, such as main memory 1106 which may be implemented in the form of a random access memory or RAM.

Instructions to processor 1105 can be provided by a transmission link or by a non-transitory storage medium from which a computer can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a remote computer. The remote computer can load the instructions into its dynamic memory (RAM) and send the instructions over a telephone line using a modem.

A modem local to computer(s) 200 (FIG. 5A) can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer(s) 200 (FIG. 5A) also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 (FIG. 5A) typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer(s) 200, are exemplary forms of carrier waves transporting the information.

Computer(s) 200 (FIG. 5A) can send messages and receive data, including program code, through the network(s), network link 1120 and communication interface 1115. In the Internet example, a server 1100 might transmit information retrieved from RDBMS database through Internet 1124, ISP 1126, local network 1122 and communication interface 1115. The instructions for performing the operations 230, 310 of FIG. 2A or 3A may be executed by processor 1105 as they are received, and/or stored in storage device 1110, or other non-volatile storage for later execution. In this manner, computer(s) 200 may additionally or alternatively obtain instructions and any related data in the form of a carrier wave.

Figure 5B:
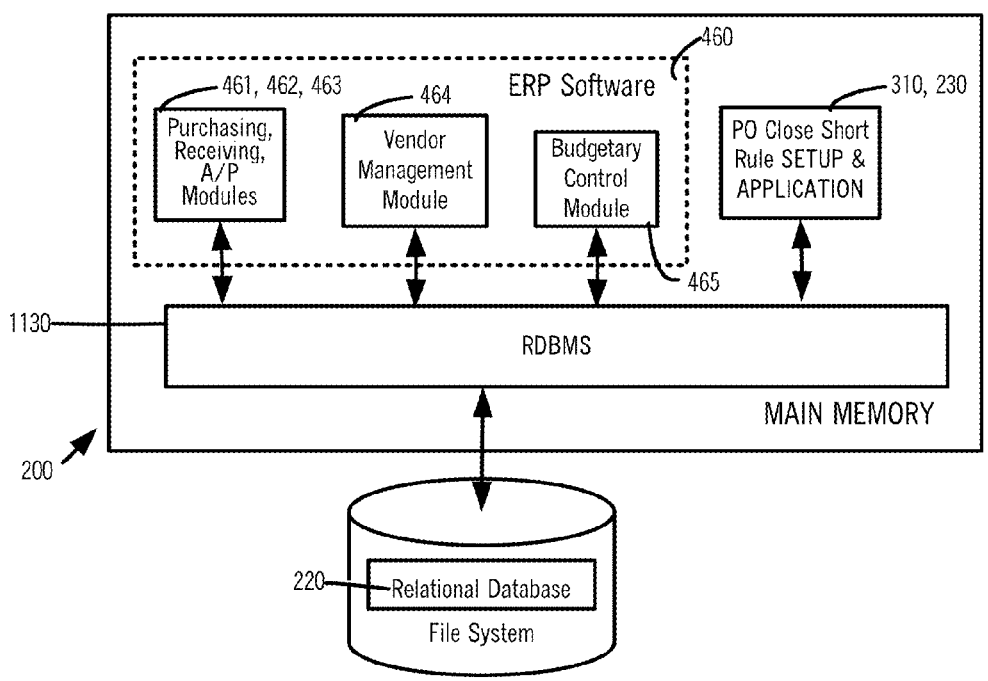

FIG. 5A is a very low-level representation of many hardware components of one or more of computer(s) 200 described above in reference to FIGS. 2A and 3A. Several embodiments have one or more additional software components in main memory 1106 as shown in FIG. 5B. In addition to main memory 1106, computer(s) 200 may include one or more other types of memory such as flash memory (or SD card) and/or a hard disk and/or an optical disk (also called "secondary memory") to store data and/or software for loading into memory 1106 (also called "main memory") and/or for use by processor(s) 1105. In some embodiments, computer(s) 200 of FIG. 5A implements a relational database management system 1130 to manage data in one or more tables of a relational database 220 of the type illustrated in FIG. 5B. Such a relational database management system 1130 may manage a distributed database system that includes multiple databases, each table being stored on different storage mechanisms.

In some embodiments, the multiple databases are made to appear as a single database. In such embodiments, processor 1105 can access and modify the data in a relational database 220 via RDBMS 1130 that accepts queries from various modules 461-466 (FIG. 4A) in conformance with a relational database language, the most common of which is the Structured Query Language (SQL). The commands are used by processor 1105 of some embodiments to store, modify and retrieve values of numeric terms in a purchase order and values of attributes of a PO line in that purchase order in the form of rows in tables in relational database 220. Relational database management system 1130 further includes output logic that makes the data in a database table available to a user via a graphical user interface that generates a screen on a video monitor display 1112. In one example, the output logic of computer(s) 200 provides results via a web-based user interface that depicts in a browser, information related to POs, receipts, invoices, etc as illustrated in any one or more of FIGS. 2B, 2C, 2D, 3B, 3C, and 4B-4G. Additionally and/or alternatively, screens responsive to a command in a command-line interface and display on a video monitor may be generated by computer(s) 200.

In some embodiments of computer(s) 200, functionality in the above-described operations or acts of FIGS. 2A and 3A is implemented by processor 1105 executing software in memory 1106 of computer(s) 200, although in other embodiments such functionality is implemented in any combination of hardware circuitry and/or firmware and/or software in computer(s) 200. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing operations or acts of FIGS. 2A and 3A can, but need not necessarily include, one or more microprocessors, embedded processors, controllers, application specific integrated circuits (ASICs), digital signal processors (DSPs), multi-core processors and the like.

Any non-transitory computer-readable medium tangibly embodying software (also called "computer instructions") may be used in implementing one or more acts or operations described herein and illustrated in FIGS. 2A and 3A. Such software may include program codes stored in memory 1106 and executed by processor 1105. Memory 1106 may be implemented within or external to processor 1105, depending on the embodiment. When implemented in firmware and/or software, logic to perform one or more acts or operations of FIGS. 2A and 3A may be stored as one or more computer instructions or code on a non-transitory computer-readable medium.

In some embodiments, one or more of computer(s) 200 may include multiple processors, each of which is programmed with software in a memory 1106 shared with each other to perform acts of the type described above to implement the individual modules illustrated in FIG. 4A. For example, a first processor 1105 in computer(s) 200 may be programmed with software in memory 1106 to implement a purchasing module 461. A second processor 1105 in computer(s) 200 may be programmed with software in memory 1106 to implement a receiving module 462. A third processor 1105 in computer(s) 200 may be programmed with software in memory 1106 to implement a AP module 463. A fourth processor 1105 in computer(s) 200 may be programmed with software in memory 1106 to implement the PO close short rule setup operation 310. A fifth processor 1105 in computer(s) 200 may be programmed with software in memory 1106 to implement a PO close short rule application operation 230.

Although five processors 1105 have been just described for some embodiments to implement the respective means, in other embodiments a single processor 1105 may be used in a time shared manner to implement the just-described means of the previous paragraph. Furthermore, in still other embodiments, one processor 1105 may be used in a time-shared manner to implement one or more parts of various modules. Furthermore, although processors 1105 have been described above for certain embodiments as being included in a single computer(s) 200, in other embodiments multiple such processors 1105 may be included in multiple computers 200, for example five computers 200 may implement the three modules 461-463 and two operations 230, 310 described above. Additionally, in one or more such embodiments, one or more processor(s) 1105 with a bus 1103 execute ERP software 460 in computer(s) 200.

Various adaptations and modifications may be made without departing from the scope of the described embodiments. Numerous modifications and adaptations of the embodiments described herein are encompassed by the attached claims.

The invention claimed is:

1. A computer-implemented method, the method comprising:
defining a set of rules, each rule of the set of rules being configured to prevent future requests according to a process, the future requests being associated with document objects, the future requests corresponding to a periodic performance of a delivery or service associated with a physical item, and two or more rules of the set of rules corresponding to processes that are different from each other;

accessing one or more servers to retrieve document data representing a particular document object, the particular document object corresponding to a periodic request for a particular physical item, the periodic request being processed at an interval, and the particular document object being stored, at least in part, at each of a receiving system associated with a first entity receiving the particular physical item and a destination system associated with a second entity providing the particular physical item;

displaying, via an interface, one or more lines associated with the particular document object, each line of the one or more lines corresponding to at least one attribute associated with the periodic request for the particular physical item, and the at least one attribute corresponding to an attribute value stored in a database;

receiving, via the interface, input corresponding to a selection of a line of the one or more lines, the selection of the line indicating a request to prevent future requests of the periodic request for the particular physical item;

in response to receiving the input:
  identifying a particular attribute that corresponds to the selected line, the particular attribute corresponding to a particular attribute value;
  accessing the set of rules;
  dynamically selecting, automatically by one or more processors, a subset of one or more rules from amongst the set of rules, the selection of the subset of one or more rules being dynamic in that the particular attribute is used to determine which subset to select from the set of rules, and another attribute different from the particular attribute causing a different subset of rules to be selected from the set of rules;
  executing the process corresponding to the selected subset of one or more rules by accessing user-specified logic included in the selected subset of one or more rules, execution of the process corresponding to the selected subset of one or more rules causing a new attribute value to be generated, the new attribute value being less than the particular attribute value; and
  transmitting, to the destination system, a notification that the particular document object has been changed, the notification including the new attribute value, the receiving of the notification causing the destination system to automatically modify the at least part of the particular document object stored at the destination system, and the automatic modification of the at least part of the particular document object causing the destination system to inhibit performance of a future delivery or future service associated with the particular physical item.

2. The computer-implemented method of claim 1 wherein the particular attribute includes a numeric term that is expressed in one of units of money or units of quantity.

3. The computer-implemented method of claim 1 wherein the particular attribute includes a numeric term is expressed in units of money and wherein:
  a first logic in a first rule among the set of rules identifies as the new attribute value, a sum of receipt amount;
  a second logic in a second rule among the set of rules identifies as the new attribute value, a matched amount; and
  a third logic in a third rule among the set of rules identifies as the new attribute value, greater of: the matched amount or the sum of receipt amount.

4. The computer-implemented method of claim 1 wherein the particular attribute includes a numeric term is expressed in units of quantity and wherein:
  a first logic in a first rule among the set of rules identifies as the new attribute value, a sum of receipt quantity;
  a second logic in a second rule among the set of rules identifies as the new attribute value, a matched quantity; or
  a third logic in a third rule among the set of rules identifies as the new attribute value, greater of: the matched quantity or the sum of receipt quantity.

5. The computer-implemented method of claim 4 further comprising:
  displaying in a control of a user interface, multiple alternative choices one of which is to be selected by user input for each of the first rule, the second rule and the third rule;
  wherein the multiple alternative choices comprise:
  a first identifier of said first logic;
  a second identifier of said second logic;
  a third identifier of said third logic; and
  a fourth identifier indicating disabling.

6. The computer-implemented method of claim 5 wherein:
  a first attribute in a plurality of attributes is a binary flag with a first value indicating that the particular physical item is goods; and
  a second attribute in the plurality of attributes has a second value indicating that receiving of the particular physical item is required to determine whether the particular document object can be closed; and
  each of the multiple alternative choices determines the new value based at least on one or more receipt(s) of the particular physical item.

7. The computer-implemented method of claim 6 wherein:
  a third attribute in the plurality of attributes has a third value indicating that full matching is required between the numeric term in the line and one or more receipt(s) of the particular physical item; and
  each of the multiple alternative choices further determines the new value based on matching.

8. The computer-implemented method of claim 1 wherein one of a plurality of attributes is a binary flag with a value indicating that the particular physical item is a service and the method further comprises:
  displaying in a control of a user interface, multiple alternative choices to determine the new value in units of money one of which is to be selected by user input as the user-specified logic.

9. The computer-implemented method of claim 1 wherein the new attribute value is stored in a change order, and the method further comprising:
  applying the change order to the particular document object to obtain a modified document object; and
  transmitting the modified document object to another computer.

10. The computer-implemented method of claim 1 further comprising:

computing a liquidated amount of funds released by changing the selected line of the particular document object; and supplying the liquidated amount of funds to a budgetary module.

11. The computer-implemented method of claim 1 wherein the set of rules is hereinafter a first plurality of rules and the method further comprising:

receiving via a predetermined screen in a user interface, the first plurality of rules and a first identifier of a first business unit of a buyer, and responding to said receiving by storing in one or more non-transitory computer-readable storage media, a relationship between the first identifier and the first plurality of rules; and additionally receiving via said predetermined screen in said user interface, a second plurality of rules and a second identifier of a second business unit of the buyer, and responding to said additionally receiving by additionally storing in said one or more non-transitory computer-readable storage media, another relationship between the second identifier and the second plurality of rules.

12. One or more non-transitory computer-readable storage media comprising a plurality of instructions that when executed cause one or more processors to perform a method, the method comprising:

defining a set of rules, each rule of the set of rules being configured to prevent future requests according to a process, the future requests being associated with document objects, the future requests corresponding to a periodic performance of a delivery or service associated with a physical item, and two or more rules of the set of rules corresponding to processes that are different from each other;

accessing one or more servers to retrieve document data representing a particular document object, the particular document object corresponding to a periodic request for a particular physical item, the periodic request being processed at an interval, and the particular document object being stored, at least in part, at each of a receiving system associated with a first entity receiving the particular physical item and a destination system associated with a second entity providing the particular physical item;

displaying, via an interface, one or more lines associated with the particular document object, each line of the one or more lines corresponding to at least one attribute associated with the periodic request for the particular physical item, and the at least one attribute corresponding to an attribute value stored in a database;

receiving, via the interface, input corresponding to a selection of a line of the one or more lines, the selection of the line indicating a request to prevent future requests of the periodic request for the particular physical item;

in response to receiving the input:

identifying a particular attribute that corresponds to the selected line, the particular attribute corresponding to a particular attribute value, accessing the set of rules;

dynamically selecting, automatically by one or more processors, a subset of one or more rules from amongst the set of rules, the selection of the subset of one or more rules being dynamic in that the particular attribute is used to determine which subset to select from the set of rules, and another attribute different from the particular attribute causing a different subset of rules to be selected from the set of rules;

executing the process corresponding to the selected subset of one or more rules by accessing user-specified logic included in the selected subset of one or more rules, the execution of the process corresponding to the selected subset of one or more rules causing a new attribute value to be generated, the new attribute value being less than the particular attribute value; and transmitting, to the destination system, a notification that the particular document object has been changed, the notification including the new attribute value, the receiving of the notification causing the destination system to automatically modify the at least part of the particular document object stored at the destination system, and the automatic modification of the at least part of the particular document object causing the destination system to inhibit performance of a future delivery or future service associated with the particular physical item.

13. The one or more non-transitory computer-readable storage media of claim 12 wherein the particular attribute includes a numeric term that is expressed in one of units of money or units of quantity.

14. The one or more non-transitory computer-readable storage media of claim 13 wherein the numeric term is expressed in units of money and wherein:

a first logic in a first rule among the set of rules identifies as the new attribute value, a sum of receipt amount;

a second logic in a second rule among the set of rules identifies as the new attribute value, a matched amount; and a third logic in a third rule among the set of rules identifies as the new attribute value, greater of: the matched amount or the sum of receipt amount.

15. The one or more non-transitory computer-readable storage media of claim 13 wherein the numeric term is expressed in units of quantity and wherein:

a first logic in a first rule among the set of rules identifies as the new attribute value, a sum of receipt quantity;

a second logic in a second rule among the set of rules identifies as the new attribute value, a matched quantity; or a third logic in a third rule among the set of rules identifies as the new attribute value, greater of: the matched quantity or the sum of receipt quantity.

16. The one or more non-transitory computer-readable storage claim 15 further comprising:

instructions to display in a control of a user interface, multiple alternative choices one of which is to be selected by user input for each of the first rule, the second rule and the third rule;

wherein the multiple alternative choices comprise:

a first identifier of said first logic;

a second identifier of said second logic;

a third identifier of said third logic; and a fourth identifier indicating disabling.

17. The one or more non-transitory computer-readable storage media of claim 16 wherein:

a first attribute in a plurality of attributes is a binary flag with a first value indicating that the particular physical item is goods;

a second attribute in the plurality of attributes has a second value indicating that receiving of the particular physical item is required to determine whether the particular document object can be closed; and a third attribute in the plurality of attributes has a third value indicating that full matching is required between the numeric term in the line and one or more receipt(s) of the particular physical item;

wherein each of the multiple alternative choices determines the new value based on one or more receipt(s) of the particular physical item and further based on matching.

18. The one or more non-transitory computer-readable storage media of claim 12 wherein one of a plurality of attributes is a binary flag with a value indicating that the particular physical item is associated with a service and the method further comprises:

displaying in a control of a user interface, multiple alternative choices to determine the new value in units of money.

19. The one or more non-transitory computer-readable storage media of claim 12 further comprising:

instructions to compute a liquidated amount of funds released by changing the line of the particular document object;

instructions to supply to a budgetary module, the liquidated amount of funds; and instructions to supply to an encumbrance module, the liquidated amount of funds.

20. An apparatus, comprising:

one or more processors; and one or more non-transitory computer-readable storage media, wherein the one or more processors are coupled to the one or more non-transitory computer-readable storage media, wherein the one or more non-transitory computer-readable storage media comprise a plurality of instructions that when executed cause the one or more processors to perform operations comprising:

defining a set of rules, each rule of the set of rules being configured to prevent future requests according to a process, the future requests being associated with document objects, the future requests corresponding to a periodic performance of a delivery or service associated with a physical item, and two or more rules of the set of rules corresponding to processes that are different from each other;

accessing one or more servers to retrieve document data representing a particular document object, the particular document object corresponding to a periodic request for a particular physical item, the periodic request being processed at an interval, and the particular document object being stored, at least in part, at each of a receiving system associated with a first entity receiving the particular physical item and a destination system associated with a second entity providing the particular physical item;

displaying, via an interface, one or more lines associated with the particular document object, each line of the one or more lines corresponding to at least one attribute associated with the periodic request for the particular physical item, and the at least one attribute corresponding to an attribute value stored in a database;

receiving, via the interface, input corresponding to a selection of a line the one or more lines, the selection of the line indicating a request to prevent future requests of the periodic request for the particular physical item in response to receiving the input:

identifying a particular attribute that corresponds to the selected line, the particular attribute corresponding to a particular attribute value, accessing the set of rules;

dynamically selecting, automatically by one or more processors, a subset of one or more rules from amongst the set of rules, the selection of the subset of one or more rules being dynamic in that the particular attribute is used to determine which subset to select from the set of rules, and another attribute different from the particular attribute causing a different subset of rules to be selected from the set of rules;

executing the process corresponding to the selected subset of one or more rules by accessing user-specified logic included in the selected subset of one or more rules, the execution of the process corresponding to the selected subset of one or more rules causing a new attribute value to be generated, the new attribute value being less than the particular attribute value; and transmitting, to the destination system, a notification that the particular document object has been changed, the notification including the new attribute value, the receiving of the notification causing the destination system to automatically modify the at least part of the particular document object stored at the destination system, and the automatic modification of the at least part of the particular document object causing the destination system to inhibit performance of a future delivery or future service associated with the particular physical item.

* * * * *

UNITED STATES PATENT AND TRADEMARK OFFICE
CERTIFICATE OF CORRECTION

| | | |
|---|---|---|
| PATENT NO. | : 10,169,808 B2 | Page 1 of 1 |
| APPLICATION NO. | : 14/181546 | |
| DATED | : January 1, 2019 | |
| INVENTOR(S) | : Dhillon et al. | |

It is certified that error appears in the above-identified patent and that said Letters Patent is hereby corrected as shown below:

In the Claims

In Column 26, Line 51, in Claim 16, after "storage" insert -- media of --.

Signed and Sealed this
Seventh Day of January, 2020

Andrei Iancu
*Director of the United States Patent and Trademark Office*